(12) United States Patent
Triplett

(10) Patent No.: US 9,513,868 B2
(45) Date of Patent: Dec. 6, 2016

(54) SOFTWARE APPLICATION AND ZONES

(71) Applicant: Sonos, Inc., Santa Barbara, CA (US)

(72) Inventor: Mark Triplett, St. Charles, IL (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/008,652

(22) Filed: Jan. 28, 2016

(65) Prior Publication Data

US 2016/0139875 A1 May 19, 2016

Related U.S. Application Data

(63) Continuation of application No. 14/155,490, filed on Jan. 15, 2014, now Pat. No. 9,300,647.

(51) Int. Cl.
*G06F 3/16* (2006.01)
*G05B 15/02* (2006.01)
*H04L 29/06* (2006.01)
*G06F 3/0484* (2013.01)
*G06F 3/0482* (2013.01)
(Continued)

(52) U.S. Cl.
CPC .............. *G06F 3/165* (2013.01); *G05B 15/02* (2013.01); *G06F 3/0482* (2013.01); *G06F 3/0484* (2013.01); *G06F 3/04886* (2013.01); *H04L 12/2814* (2013.01); *H04L 63/08* (2013.01); *H04N 21/41407* (2013.01); *H04N 21/43615* (2013.01); *H04W 4/021* (2013.01); *H04W 4/043* (2013.01)

(58) Field of Classification Search
CPC ........ G06F 3/165; G06F 3/16; G06F 17/3074; G05B 15/02; G10L 19/018
See application file for complete search history.

(56) References Cited

U.S. PATENT DOCUMENTS 4,296,278 A 10/1981 Cullison et al.
4,816,989 A 3/1989 Finn et al.
(Continued)

FOREIGN PATENT DOCUMENTS

EP 0251584 A2 1/1988
EP 0672985 A1 9/1995
(Continued)

OTHER PUBLICATIONS

Akyildiz et al., "Multimedia Group Synchronization Protocols for Integrated Services Networks," IEEE Journal on Selected Areas in Communications, 1996 pp. 162-173, vol. 14, No. 1.
(Continued)

*Primary Examiner* — Yonas Bayou
(74) *Attorney, Agent, or Firm* — McDonnell Boehnen Hulbert & Berghoff LLP

(57) ABSTRACT

Embodiments described herein relate to a software application that is configured to operate as an add-on software component to audio-playback software on a playback device of a media playback system. One embodiment may involve transmitting, to a computing device, data indicating that a first add-on component installed on a playback device is active; receiving, from the computing device, a command to activate a second add-on component installed on a playback device; in response to receiving the command, activating the second add-on component on the playback device; and causing playback of audio using at least the second add-on component.

20 Claims, 14 Drawing Sheets

(51) Int. Cl.
*G06F 3/0488* (2013.01)
*H04L 12/28* (2006.01)
*H04W 4/02* (2009.01)
*H04W 4/04* (2009.01)
*H04N 21/414* (2011.01)
*H04N 21/436* (2011.01)

(56) References Cited

U.S. PATENT DOCUMENTS

| | | | |
|---|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,625,783 A | 4/1997 | Ezekiel et al. |
| 5,668,884 A | 9/1997 | Clair, Jr. et al. |
| 5,673,323 A | 9/1997 | Schotz et al. |
| 5,751,819 A | 5/1998 | Dorrough |
| 5,808,662 A | 9/1998 | Kinney et al. |
| 5,815,689 A | 9/1998 | Shaw et al. |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,009,457 A | 12/1999 | Moller |
| 6,026,150 A | 2/2000 | Frank et al. |
| 6,031,818 A | 2/2000 | Lo et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van Ryzin et al. |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,598,172 B1 | 7/2003 | VanDeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,999 B2 | 9/2006 | Pestoni et al. |
| 7,115,017 B1 | 10/2006 | Laursen et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,293,060 B2 | 11/2007 | Komsi |
| 7,312,785 B2 | 12/2007 | Tsuk et al. |
| 7,324,857 B2 | 1/2008 | Goddard |
| 7,333,519 B2 | 2/2008 | Sullivan et al. |
| 7,372,846 B2 | 5/2008 | Zwack |
| 7,392,102 B2 | 6/2008 | Sullivan et al. |
| 7,483,538 B2 | 1/2009 | McCarty et al. |
| 7,483,958 B1 | 1/2009 | Elabbady et al. |
| 7,571,014 B1 * | 8/2009 | Lambourne ............ H04R 27/00 700/94 |
| 7,574,274 B2 | 8/2009 | Holmes |
| 7,599,685 B2 | 10/2009 | Goldberg et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,219 B2 | 2/2010 | Scott, III |
| 7,675,943 B2 | 3/2010 | Mosig |
| 7,676,142 B1 | 3/2010 | Hung |
| 7,702,279 B2 | 4/2010 | Ko et al. |
| 7,720,096 B2 | 5/2010 | Klemets |
| 7,742,740 B2 | 6/2010 | Goldberg et al. |
| 7,790,311 B2 * | 9/2010 | Cho ........................ H01M 2/06 429/161 |
| 7,792,311 B1 * | 9/2010 | Holmgren ............... H04S 7/308 381/17 |
| 7,805,682 B1 * | 9/2010 | Lambourne ........... G06F 3/0482 715/764 |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,934,239 B1 | 4/2011 | Dagman |
| 8,014,423 B2 | 9/2011 | Thaler et al. |
| 8,023,663 B2 | 9/2011 | Goldberg |
| 8,024,055 B1 * | 9/2011 | Holmgren ................ H03F 1/52 381/120 |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,214,873 B2 | 7/2012 | Weel |
| 8,230,099 B2 | 7/2012 | Weel |
| 8,234,395 B2 | 7/2012 | Millington et al. |
| 8,290,603 B1 * | 10/2012 | Lambourne ............ G11B 27/00 381/104 |
| 8,315,555 B2 | 11/2012 | Ko et al. |
| 8,326,951 B1 * | 12/2012 | Millington ............ H04W 12/08 370/254 |
| 8,370,678 B2 | 2/2013 | Millington et al. |
| 8,423,659 B2 | 4/2013 | Millington |
| 8,527,876 B2 | 9/2013 | Wood et al. |
| 8,588,949 B2 | 11/2013 | Lambourne et al. |
| 8,775,546 B2 | 7/2014 | Millington |
| 8,989,406 B2 | 3/2015 | Wong et al. |
| 9,191,699 B2 | 11/2015 | Agerbak et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |

(56) References Cited

U.S. PATENT DOCUMENTS

| | | |
|---|---|---|
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0089529 A1 | 7/2002 | Robbin |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0168938 A1 | 11/2002 | Chang |
| 2002/0188762 A1 | 12/2002 | Tomassetti et al. |
| 2002/0194309 A1 | 12/2002 | Carter et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0131192 A1 | 7/2004 | Metcalf |
| 2004/0170383 A1 | 9/2004 | Mazur |
| 2004/0175159 A1 | 9/2004 | Oetzel et al. |
| 2004/0203378 A1 | 10/2004 | Powers |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0114538 A1 | 5/2005 | Rose |
| 2005/0125357 A1 | 6/2005 | Saadat et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0008256 A1 | 1/2006 | Khedouri et al. |
| 2006/0026521 A1 | 2/2006 | Hotelling et al. |
| 2006/0095516 A1 | 5/2006 | Wijeratne |
| 2006/0119497 A1 | 6/2006 | Miller et al. |
| 2006/0143236 A1 | 6/2006 | Wu |
| 2006/0195480 A1 | 8/2006 | Spiegelman et al. |
| 2006/0225097 A1 | 10/2006 | Lawrence-Apfelbaum |
| 2007/0038999 A1 | 2/2007 | Millington et al. |
| 2007/0048713 A1 | 3/2007 | Plastina et al. |
| 2007/0054680 A1 | 3/2007 | Mo et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0150830 A1 | 6/2007 | Ording et al. |
| 2007/0169115 A1 | 7/2007 | Ko et al. |
| 2007/0180137 A1 | 8/2007 | Rajapakse |
| 2007/0271388 A1 | 11/2007 | Bowra et al. |
| 2007/0299778 A1 | 12/2007 | Haveson et al. |
| 2008/0022320 A1 | 1/2008 | Ver Steeg |
| 2008/0052371 A1 | 2/2008 | Partovi et al. |
| 2008/0091771 A1 | 4/2008 | Allen et al. |
| 2008/0120429 A1 | 5/2008 | Millington et al. |
| 2008/0144861 A1 | 6/2008 | Melanson et al. |
| 2008/0195239 A1* | 8/2008 | Rotholtz ........... G06F 17/30749 700/94 |
| 2009/0031336 A1 | 1/2009 | Chavez et al. |
| 2009/0157905 A1 | 6/2009 | Davis |
| 2009/0222115 A1 | 9/2009 | Malcolm et al. |
| 2009/0228919 A1 | 9/2009 | Zott et al. |
| 2010/0010852 A1* | 1/2010 | Lang .................. G06F 9/44505 705/59 |
| 2010/0049835 A1 | 2/2010 | Ko et al. |
| 2010/0228740 A1 | 9/2010 | Cannistraro et al. |
| 2010/0299639 A1 | 11/2010 | Ramsay et al. |
| 2010/0312366 A1* | 12/2010 | Madonna ........... H05B 37/0245 700/90 |
| 2010/0318911 A1* | 12/2010 | Holladay ......... H04N 21/43615 715/716 |
| 2011/0066943 A1 | 3/2011 | Brillon et al. |
| 2011/0087842 A1 | 4/2011 | Lu et al. |
| 2012/0029671 A1 | 2/2012 | Millington et al. |
| 2012/0030366 A1 | 2/2012 | Collart et al. |
| 2012/0060046 A1 | 3/2012 | Millington |
| 2012/0096125 A1* | 4/2012 | Kallai .................... H03G 5/005 709/219 |
| 2012/0129446 A1 | 5/2012 | Ko et al. |
| 2012/0263318 A1* | 10/2012 | Millington ............. G11B 27/10 381/107 |
| 2012/0326835 A1 | 12/2012 | Cockrell et al. |
| 2013/0080599 A1 | 3/2013 | Ko et al. |
| 2013/0173034 A1* | 7/2013 | Reimann ........... G06F 17/30761 700/94 |
| 2013/0191454 A1 | 7/2013 | Oliver et al. |
| 2013/0202131 A1 | 8/2013 | Kemmochi et al. |
| 2013/0343567 A1 | 12/2013 | Triplett et al. |
| 2014/0192986 A1 | 7/2014 | Lee et al. |
| 2014/0219483 A1 | 8/2014 | Hong |
| 2014/0363024 A1 | 12/2014 | Apodaca |

FOREIGN PATENT DOCUMENTS

| | | |
|---|---|---|
| EP | 1111527 A2 | 6/2001 |
| EP | 1122931 A2 | 8/2001 |
| GB | 2284327 A | 5/1995 |
| WO | 9525313 | 9/1995 |
| WO | 9961985 | 12/1999 |
| WO | 0153994 | 7/2001 |
| WO | 2005013047 | 2/2005 |

OTHER PUBLICATIONS

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Benslimane Abderrahim, "A Multimedia Synchronization Protocol for Multicast Groups," Proceedings of the 26th Euromicro Conference, 2000, pp. 456-463, vol. 1.

(56) References Cited

OTHER PUBLICATIONS

Biersack et al., "Intra- and Inter-Stream Synchronization for Stored Multimedia Streams," IEEE International Conference on Multimedia Computing and Systems, 1996, pp. 372-381.
Blakowski G. et al., "A Media Synchronization Survey: Reference Model, Specification, and Case Studies", Jan. 1996, vol. 14, No. 1, 5-35.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:, pp. 1-23.
Dell, Inc. "Dell Digital Audio Receiver: Reference Guide," Jun. 2000, 70 pages.
Dell, Inc. "Start Here," Jun. 2000, 2 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Searching Authority, International Search Report and Written Opinion mailed on Apr. 2, 2015, issued in connection with International Application No. PCT/US2015/011351, filed on Jan. 14, 2015, 14 pages.
Ishibashi et al., "A Group Synchronization Mechanism for Live Media in Multicast Communications," IEEE Global Telecommunications Conference, 1997, pp. 746-752, vol. 2.
Ishibashi Y., "A Group Synchronization Mechanism for Stored Media in Multicast Communications," IEEE Information Revolution and Communications, 1997, pp. 692-700, vol. 2.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Microsoft; Corporation., "Using Microsoft Outlook 2003", Cambridge College, 2003.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola., "Simplefi, Wireless Digital Audio Receiver, Installation and User Guide", Dec. 31, 2001, 111 pages.
Nilsson, M., "ID3 Tag Version 2", Mar. 26, 1998, 28 pages.
Notice of Allowance mailed on Nov. 2, 2015, issued in connection with U.S. Appl. No. 14/155,490, filed Jan. 15, 2014, 9 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer manual: copyright 2001.
Presentations at WinHEC 2000, May 2000, 138 pages.
PRISMIQ; Inc., "PRISMIQ Media Player User Guide", 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
The MPEG-2 Transport Stream. Retrieved from the Internet: http://www.coolstf.com/mpeg, 2006, 5 pages.
UPnP; "Universal Plug and Play Device Architecture," Jun. 8, 2000; version 1.0; Microsoft Corporation; pp. 1-54.
Yamaha DME 32 manual: copyright 2001.
International Bureau, International Preliminary Report on Patentability mailed on Jul. 28, 2016, issued in connection with International Application No. PCT/US2015/011351, filed on Jan. 14, 2015, 11 pages.

\* cited by examiner

SOFTWARE APPLICATION AND ZONES

CROSS REFERENCE TO RELATED APPLICATIONS

This application claims priority under 35 U.S.C. §120 to, and is a continuation of, U.S. non-provisional patent application Ser. No. 14/155,490, filed on Jan. 15, 2014, entitled "Software Application and Zones," which is incorporated herein by reference.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected playback devices, dynamically group or ungroup playback devices upon command, wirelessly send the audio over a local network amongst playback devices, and play the digital audio out loud across multiple playback devices in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
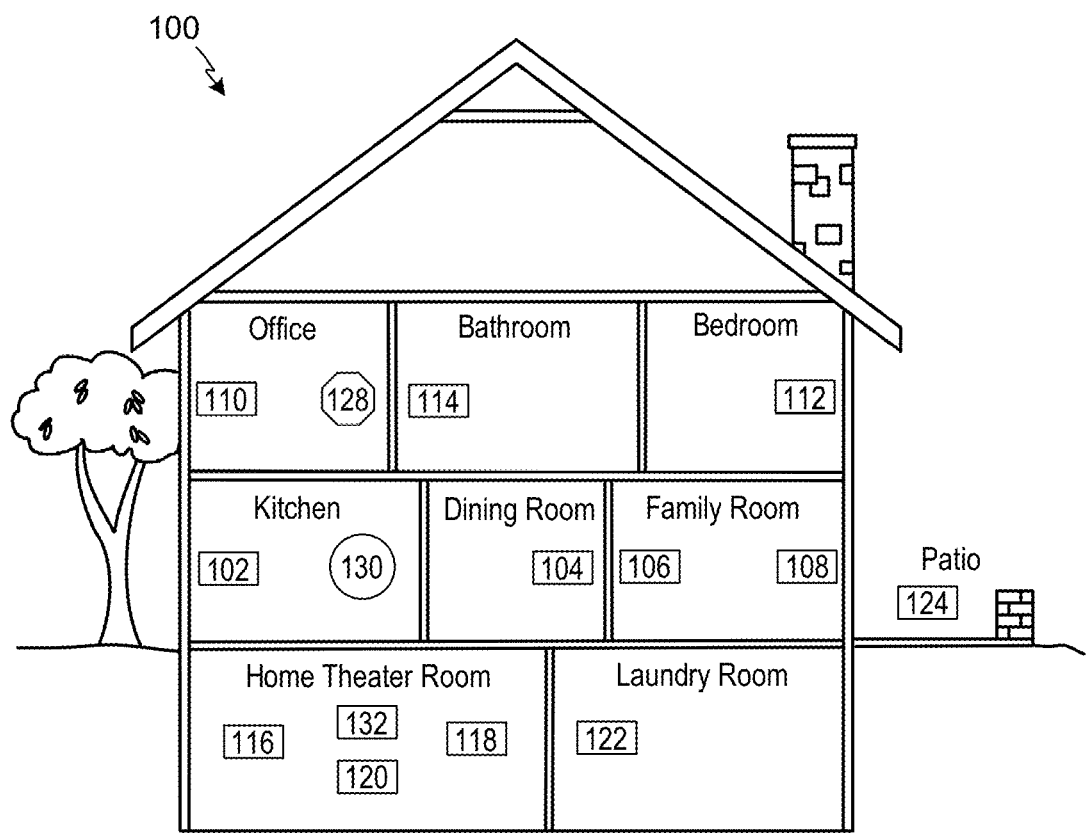
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein relate to a media playback system in which one or more software applications may be installed thereon that operate as add-on software component(s) to audio-playback software. An application identifier may be displayed on a controller of the media playback system that indicates the one or more software applications are assigned to the playback device, which may be part of a zone of the media playback system. The one or more software applications may be configured to add or to alter functionality of the audio-playback software, where the audio-playback software refers to software configured to cause the playback device to reproduce audio, among other functions. Audio-playback software is typically installed on new playback device(s) by the manufacturer.

In some embodiments, the one or more add-on software applications can be installed onto a playback device or group of playback devices. As noted above, each of the one or more software applications may operate as a respective add-on component to the audio-playback software. Though the examples of add-on software applications may be virtually endless and oftentimes limited by the imagination of the developer, by way of illustration, an example software application may operate as one or more third-party equalizer pre-sets that adjust frequency components of audio played by the playback device.

In an embodiment, a user interface of a controller of a media playback system displays a zone identifier that identifies a zone of the media playback system. The zone may include one or more playback devices where each playback device comes from the manufacturer with audio-playback software installed. The user interface may also display an application identifier in association with the zone identifier to indicate that a software application installed on one or more of the playback devices associated with the zone is configured to operate as an add-on software component to the audio-playback software. A particular software application that is configured to operate as an add-on component to the audio-playback software may be referred to as being assigned to the zone or active in the zone.

In an embodiment, the arrangement of the zone identifier and application identifier on a user interface may indicate that: (1) the software application is installed on one or more playback devices that are associated with a particular zone or zone group; and/or (2) the software application is presently configured to operate as an add-on software component to the audio-playback software on one or more of the playback devices associated with the zone. When the software application is not presently operating as an add-on software component, the application identifier may change its appearance, such as by dimming or graying out, or, in other embodiments, the application identifier is not displayed on the user interface.

In an embodiment, a playback device (a) is configured to play audio in a zone of a media playback system, and (b) has audio-playback software installed thereon. In an embodiment, the playback device receives the software application from a remote server via the interface and the playback device installs the software application. In an embodiment, the playback device sends status information to a controller of the media playback system indicating that the software application is installed on the playback device.

In an embodiment, a playback device may receive a command from the controller of the media playback system to assign the software application to the zone of the media playback system. Once assigned, the software application may be configured to operate as an add-on software component to the audio-playback software.

As indicated above, the present application relates to a software application that is configured to operate as an add-on software component to audio-playback software on a playback device of a media playback system. In one aspect, a method is provided. The method involves displaying, on a user interface of a controller of a media playback system, a zone identifier that identifies a zone of the media playback system, where the zone includes one or more playback device that have audio-playback software installed thereon. The method also involves displaying, on the user interface of the controller, an application identifier in association with the zone identifier, where the application identifier indicates that a software application installed on one or more of the playback devices that are associated with the zone is configured to operate as an add-on software component to the audio-playback software.

In another aspect, a device is provided. The device includes a user interface; a network interface; a processor; a data storage; and a program logic stored in the data storage and executable by the processor to: display, on the user interface of the controller of a media playback system, a zone identifier that identifies a zone of the media playback system, where the zone includes a playback device that has audio-playback software installed thereon; and display, on the user interface of the controller, an application identifier in association with the zone identifier, where the application identifier indicates that a software application installed on the playback device is configured to operate as an add-on software component to the audio-playback software.

In another aspect, a non-transitory computer readable memory is provided. The non-transitory computer readable memory has stored thereon instructions executable by a controller to cause the controller to perform functions. The functions include displaying, on a user interface of a controller of a media playback system, a zone identifier that identifies a zone of the media playback system, where the zone includes one or more playback devices that have audio-playback software installed thereon. The functions further include displaying, on the user interface of the controller, an application identifier in association with the zone identifier, where the application identifier indicates that a software application installed on one or more of the playback devices that are associated with the zone is configured to operate as an add-on software component to the audio-playback software.

In another aspect, a second method is provided. The method involves providing an interface to receive a software application on a playback device, where the playback device (a) is configured to play audio in a zone of a media playback system, and (b) has audio-playback software installed thereon; sending status information to a controller of the media playback system, where the status information indicates that the software application is installed on the playback device and receiving a command from the controller of the media playback system to assign the software application to the zone of the media playback system, where the software application is configured to operate as an add-on software component to the audio-playback software.]

In another aspect, a playback device is provided. The playback device includes a network interface; a processor; a data storage; and a program logic stored in the data storage and executable by the processor to: receive a software application via a network interface, where the playback device (a) is configured to play audio in a zone of a media playback system, and (b) has audio-playback software installed thereon; send status information to a controller of the media playback system, where the status information indicates that the software application is installed on the playback device; and receive a command from the controller of the media playback system to assign the software application to the zone of the media playback system, where the software application is configured to operate as an add-on software component to the audio-playback software.

In another aspect, a second non-transitory computer readable medium is provided. The non-transitory computer readable memory has stored thereon instructions executable by a controller to cause the controller to perform functions. The functions include receiving a command from a controller of a media playback system to assign a software application to a zone of the media playback system, where the playback device (a) is configured to play audio in the zone of the media playback system, and (b) has audio-playback software installed thereon; providing an interface to receive the software application on the playback device, where the software application is configured to operate as an add-on software component to the audio-playback software; and sending status information to a controller of the media playback system, where the status information indicates that the software application is installed on the playback device.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of playback devices 102-124 are shown in each respective zone. Playback devices 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Playback Devices

Figure 2A:
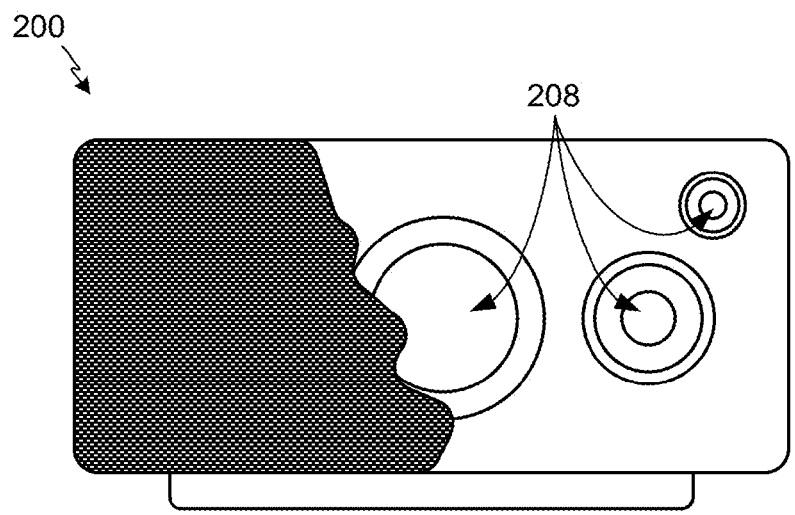
FIG. 2A shows an illustration of an example playback device having a built-in amplifier and transducers.
Figure 2B:
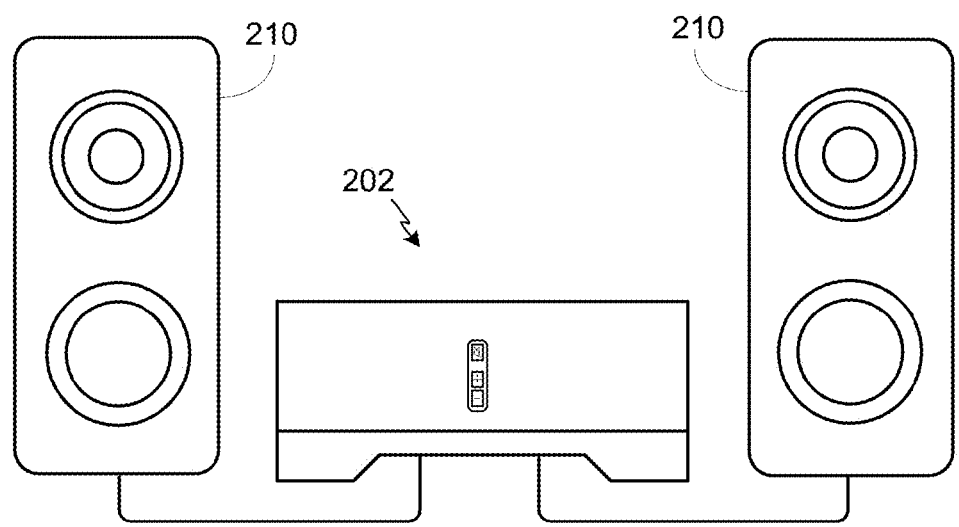
FIG. 2B shows an illustration of an example playback device having a built-in amplifier and connected to external speakers.
Figure 2C:
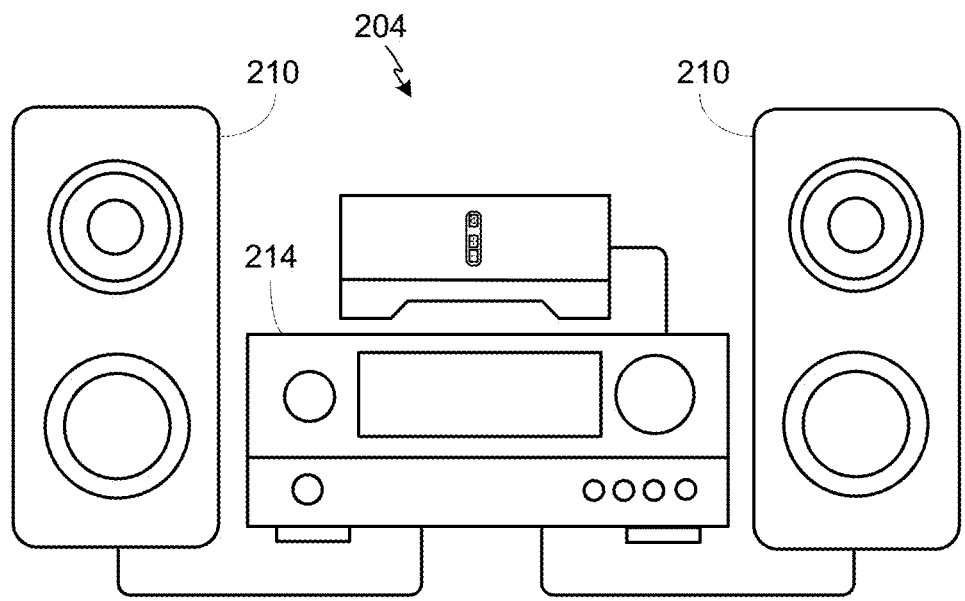
FIG. 2C shows an illustration of an example playback device connected to an A/V receiver and speakers.

FIGS. 2A, 2B, and 2C show example types of playback devices. Playback devices 200, 202, and 204 of FIGS. 2A, 2B, and 2C, respectively, can correspond to any of the playback devices 102-124 of FIG. 1, for example. In some embodiments, audio is reproduced using only a single playback device, such as by a full-range player. In some embodiments, audio is reproduced using two or more playback devices, such as by using a combination of full-range players or a combination of full-range and specialized players. In some embodiments, playback devices 200-204 may also be referred to as a "smart speaker," because they contain processing capabilities beyond the reproduction of audio, more of which is described below.

FIG. 2A illustrates a playback device 200 that includes sound producing equipment 208 capable of reproducing full-range sound. The sound may come from an audio signal that is received and processed by playback device 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, playback device 200 can be statically or dynamically configured to play stereophonic audio, monaural audio, or both. In some embodiments, playback device 200 may be dynamically configured to reproduce a subset of full-range sound, such as when playback device 200 is grouped with other playback devices to play stereophonic audio, monaural audio, and/or surround audio or when the media content received by playback device 200 is less than full-range.

FIG. 2B illustrates playback device 202 that includes a built-in amplifier to power a set of detached speakers 210. A detached speaker can include, for example, any type of loudspeaker. Playback device 202 may be configured to power one, two, or more separate loudspeakers. Playback device 202 may be configured to communicate an audio signal (e.g., right and left channel audio or more channels depending on its configuration) to the detached speakers 210 via a wired path.

FIG. 2C illustrates playback device 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the playback devices 102 to 124 can retrieve audio directly from a source. For example, a particular playback device in a zone or zone group may be assigned to a playback queue (or "queue"). The playback queue contains information corresponding to zero or more audio items for playback by the associated zone or zone group. The playback queue may be stored in memory on a playback device or some other designated device. Each item contained in the playback queue may comprise a uniform resource identifier (URI) or some other identifier that can be used by the playback device(s) to seek out and/or retrieve the audio items from the identified audio source(s). Depending on the item, the audio source might be found on the Internet (e.g., the cloud), locally from another device over the data network 128 (described further below), from the controller 130, stored on the playback device itself, or from an audio source communicating directly to the playback device. In some embodiments, the playback device can reproduce the audio itself (e.g., play the audio), send the audio to another playback device for reproduction, or both where the audio is reproduced by the playback device as well as one or more additional playback devices (possibly in synchrony). In some embodiments, the playback device may play a first audio content (or alternatively, may not play the content at all), while sending a second, different audio content to another playback device(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale playback devices referred to as a "PLAY:5," "PLAY:3," "PLAYBAR," "CONNECT: AMP," "CONNECT," and "SUB." Any other past, present, and/or future playback devices can additionally or alternatively be used to implement the playback devices of example embodiments disclosed herein. Additionally, it is understood that a playback device is not limited to the particular examples illustrated in FIGS. 2A, 2B, and 2C or to the SONOS product offerings. For example, a playback device may include a wired or wireless headphone. In yet another example, a playback device might include a sound bar for television. In yet another example, a playback device may include or interact with a docking station for an Apple iPod™ or similar device.

b. Example Controllers

Figure 3:
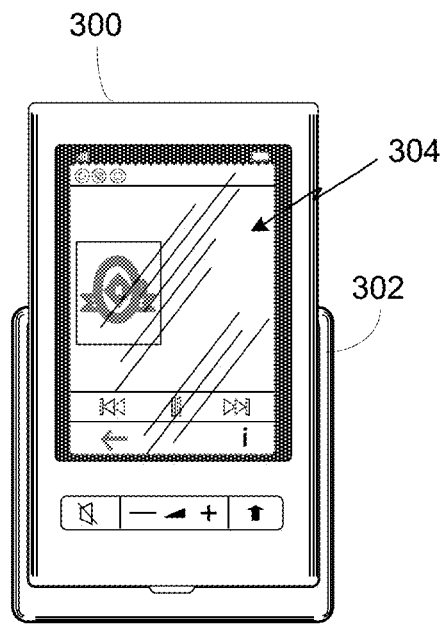
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more playback devices, control other operations of one or more playback devices, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the playback devices; the state variable may provide information about system 100, such as current zone group configuration, what is playing in one or more zones, volume levels, and other items of interest. The state variable may be passed around on data network 128 between playback devices (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a playback device, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Playback devices 102-124 of FIG. 1 are coupled directly or indirectly to a data network, such as data network 128. Controller 130 may also be coupled directly or indirectly to data network 128 or individual playback devices. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the playback devices 102-124 are wirelessly coupled to data network 128 based on a proprietary mesh network. In some embodiments, one or more of the playback devices are coupled to data network 128 using a centralized access point such as a wired or wireless router. In some embodiments, one or more of the playback devices 102-124 are coupled via a wire to data network 128 using Ethernet or similar technology. In addition to the one or more playback devices 102-124 connecting to data network 128, data network 128 can further allow access to a wide area network, such as the Internet.

In some embodiments, connecting any of the playback devices 102-124, or some other connecting device, to a broadband router, can create data network 128. Other playback devices 102-124 can then be added wired or wirelessly to the data network 128. For example, a playback device (e.g., any of playback devices 102-124) can be added to the system configuration 100 by simply pressing a button on the playback device itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more playback devices. For example, the family room of FIG. 1 contains two playback devices 106 and 108, while the kitchen is shown with one playback device 102. In another example, the home theater room contains additional playback devices to play audio from a 5.1 channel or greater audio source (e.g., a movie encoded with 5.1 or greater audio channels). In some embodiments, one can position a playback device in a room or space and assign the playback device to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more playback devices, such as the two playback devices 106 and 108 in the family room, then the two playback devices 106 and 108 can be configured to play the same audio source in synchrony, or the two playback devices 106 and 108 can be paired to play two separate sounds in left and right channels, for example. In other words, the stereo effects of a sound can be reproduced or enhanced through the two playback devices 106 and 108, one for the left sound and the other for the right sound. In certain embodiments, paired playback devices (also referred to as "bonded playback devices") can play audio in synchrony with other playback devices in the same or different zones.

In some embodiments, two or more playback devices can be sonically consolidated to form a single, consolidated playback device. A consolidated playback device (though made up of multiple, separate devices) can be configured to process and reproduce sound differently than an unconsolidated playback device or playback devices that are paired, because a consolidated playback device will have additional speaker drivers from which sound can be passed. The consolidated playback device can further be paired with a single playback device or yet another consolidated playback device. Each playback device of a consolidated playback device can be set in a consolidated mode, for example.

According to some embodiments, one can continue to do any of: group, consolidate, and pair playback devices, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via playback device 124, while someone is preparing food in the kitchen and listening to classical music via playback device 102. Further, someone can be in the office listening to the same jazz music via playback device 110 that is playing on the patio via playback device 124. In some embodiments, the jazz music played via playback devices 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by playback devices 102-124 are numerous. In some embodiments, audio on a playback device itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a playback device, for example. Audio content may also be accessed using a different protocol, such as Airplay™, which is a wireless technology by Apple, Inc., for example. Audio content received from one or more sources can be shared amongst the playback devices 102 to 124 via data network 128 and/or controller 130. The above-disclosed sources of audio content are referred to herein as network-based audio information sources. However, network-based audio information sources are not limited thereto.

In some embodiments, the example home theater playback devices 116, 118, 120 are coupled to an audio information source such as a television 132. In some examples, the television 132 is used as a source of audio for the home theater playback devices 116, 118, 120, while in other examples audio information from the television 132 may be shared with any of the playback devices 102-124 in the audio system 100.

III. Example Playback Devices

Figure 4:
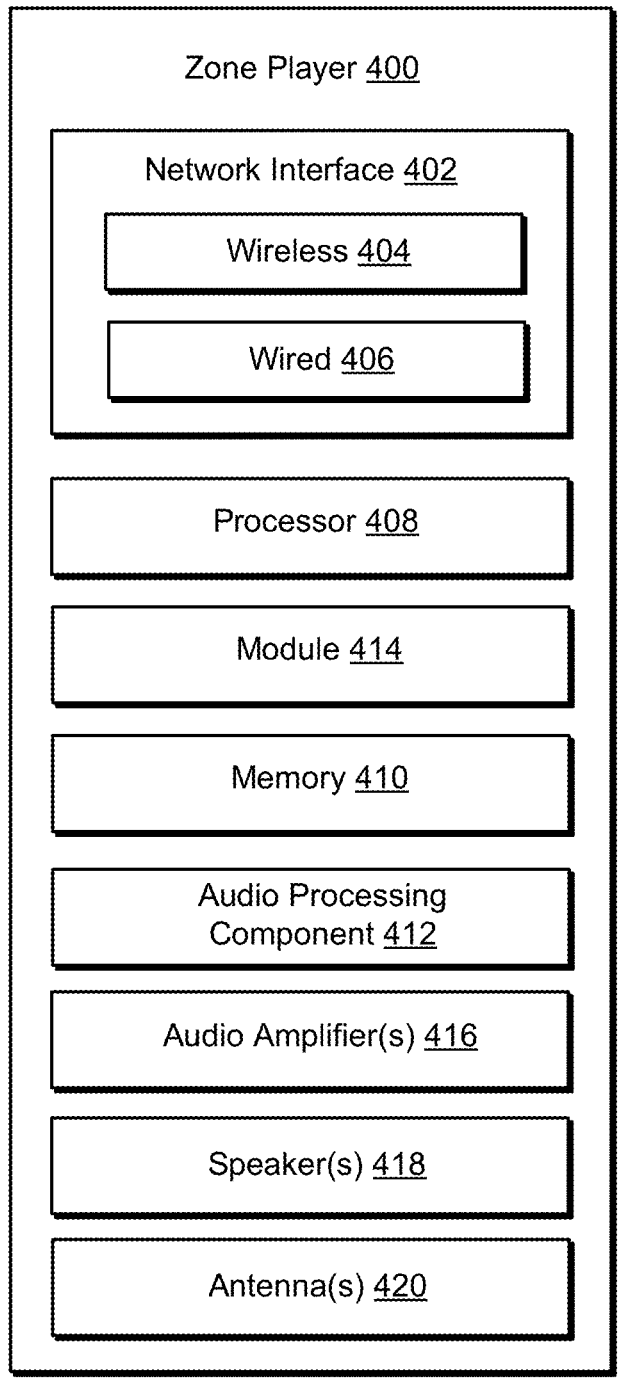
FIG. 4 shows an internal functional block diagram of an example playback device.

Referring now to FIG. 4, there is shown an example block diagram of a playback device 400 in accordance with an embodiment. Playback device 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a playback device. Other types of playback devices may not include the speaker unit 418 (e.g., such as shown in FIG. 2B) or the audio amplifier 416 (e.g., such as shown in FIG. 2C). Further, it is contemplated that the playback device 400 can be integrated into another component. For example, the playback device 400 could be constructed as part of a television, lighting, or some other device for indoor or outdoor use.

In some embodiments, network interface 402 facilitates a data flow between playback device 400 and other devices on a data network 128. In some embodiments, in addition to getting audio from another playback device or device on data network 128, playback device 400 may access audio directly from the audio source, such as over a wide area network or on the local network. In some embodiments, the network interface 402 can further handle the address part of each packet so that it gets to the right destination or intercepts packets destined for the playback device 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the playback device 400 to wirelessly communicate with other devices (e.g., other playback device(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the playback device 400 includes one or more antennas 420. The wired interface 406 provides network interface functions for the playback device 400 to communicate over a wire with other devices in accordance with a communication protocol (e.g., IEEE 802.3). In some embodiments, a playback device includes multiple wireless 404 interfaces. In some embodiments, a playback device includes multiple wired 406 interfaces. In some embodiments, a playback device includes both of the interfaces 404 and 406. In some embodiments, a playback device 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the playback device 400 to retrieve audio data from another playback device or a device on a network (e.g., using a uniform resource locator (URL) or some other identifier). In some embodiments, a task may be for the playback device 400 to send audio data to another playback device or device on a network. In some embodiments, a task may be for the playback device 400 to synchronize playback of audio with one or more additional playback devices. In some embodiments, a task may be to pair the playback device 400 with one or more playback devices to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from playback device 400, send to another playback device on a network, or both play and send to another playback device on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a playback device with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
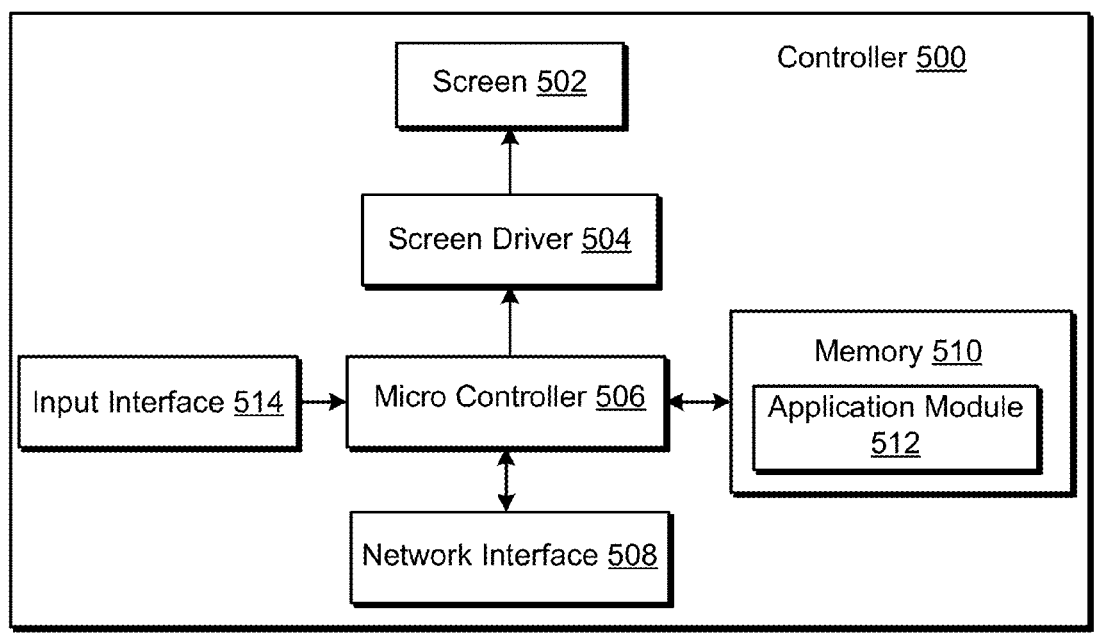
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more playback devices (e.g., the playback devices 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a playback device, a picture (e.g., album art) or any other data, associated with the audio and/or audio source can be transmitted from a playback device or other electronic device to controller 500 for display.

Controller 500 is provided with a screen 502 and an input interface 514 that allows a user to interact with the controller 500, for example, to navigate a playlist of many multimedia items and to control operations of one or more playback devices. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected playback devices into a zone group to facilitate synchronized playback amongst the playback devices in the zone group. In some embodiments, an application module 512 is configured to control the audio sounds (e.g., volume) of the playback devices in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a playback device. In some embodiments, the commands such as volume control and audio playback synchronization are sent via the network interface 508. In some embodiments, a saved zone group configuration is transmitted between a playback device and a controller via the network interface 508. The controller 500 can control one or more playback devices, such as 102-124 of FIG. 1. There can be more than one controller for a particular system, and each controller may share common information with another controller, or retrieve the common information from a playback device, if such a playback device stores configuration data (e.g., such as a state variable). Further, a controller can be integrated into a playback device.

It should be noted that other network-enabled devices such as an iPhone™, iPad™ or any other smart phone or network-enabled device (e.g., a networked computer such as a PC or Mac™) can also be used as a controller to interact or control playback devices in a particular environment. In some embodiments, a software application or upgrade can be downloaded onto a network-enabled device to perform the functions described herein.

In certain embodiments, a user can create a zone group (also referred to as a bonded zone) including at least two playback devices from the controller 500. The playback devices in the zone group can play audio in a synchronized fashion, such that all of the playback devices in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the playback devices and causes other playback devices in the group to be increased together in volume.

A user via the controller 500 can group playback devices into a zone group by activating a "Link Zones" or "Add Zone" soft button, or de-grouping a zone group by activating an "Unlink Zones" or "Drop Zone" button. For example, one mechanism for 'joining' playback devices together for audio playback is to link a number of playback devices together to form a group. To link a number of playback devices together, a user can manually link each playback device or room one after the other. For example, assume that there is a multi-zone system that includes the following zones: Bathroom, Bedroom, Den, Dining Room, Family Room, and Foyer. In certain embodiments, a user can link any number of the six playback devices, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a playback device, for example.

V. Playback Queue

As discussed above, in some embodiments, a playback device may be assigned to a playback queue identifying zero or more media items for playback by the playback device. The media items identified in a playback queue may be represented to the user via an interface on a controller. For instance, the representation may show the user (or users if more than one controller is connected to the system) how the playback device is traversing the playback queue, such as by highlighting the "now playing" item, graying out the previously played item(s), highlighting the to-be-played item(s), and so on.

In some embodiments, a single playback device is assigned to a playback queue. For example, playback device 114 in the bathroom of FIG. 1 may be linked or assigned to a "Bathroom" playback queue. In an embodiment, the "Bathroom" playback queue might have been established by the system as a result of the user naming the playback device 114 to the bathroom. As such, contents populated and identified in the "Bathroom" playback queue can be played via the playback device 114 (the bathroom zone).

In some embodiments, a zone or zone group is assigned to a playback queue. For example, playback devices 106 and 108 in the family room of FIG. 1 may be linked or assigned to a "Family room" playback queue. In another example, if family room and dining room zones were grouped, then the new group would be linked or assigned to a family room+ dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the playback devices in the zone or zone group may store in memory the associated playback queue.

Figure 6:
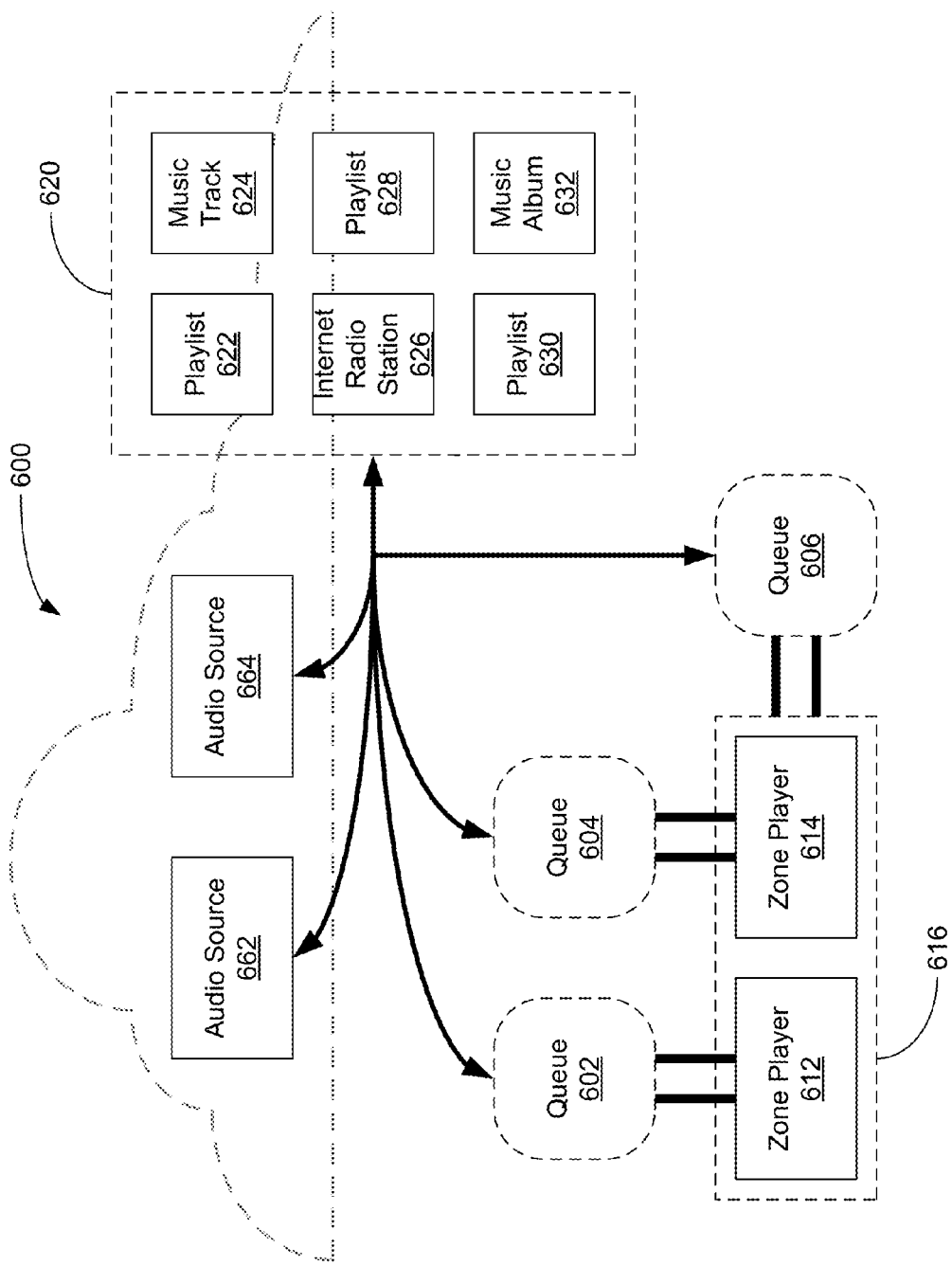
FIG. 6 shows an example playback queue configuration for a network media system.

As such, when zones or zone groups are "grouped" or "ungrouped" dynamically by the user via a controller, the system will, in some embodiments, establish or remove/ rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on). [77] By way of illustration, FIG. 6 shows an example network 600 for media content playback. As shown, the example network 600 includes example playback devices 612 and 614, example audio sources 662 and 664, and example media items 620. The example media items 620 may include playlist 622, music track 624, favorite Internet radio station 626, playlists 628 and 630, and album 632. In one embodiment, the playback devices 612 and 614 may be any of the playback devices shown in FIGS. 1, 2, and 4. For instance, playback devices 612 and 614 may be the playback devices 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the playback devices 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a playback device(s). In one embodiment, the example media items may be a collection of links or pointers (i.e., URI) to the underlying data for media items that are stored elsewhere, such as the audio sources 662 and 664. In another embodiment, the media items may include pointers to media content stored on the local playback device, another playback device over a local network, or a controller device connected to the local network.

As shown, the example network 600 may also include an example queue 602 associated with the playback device 612, and an example queue 604 associated with the playback device 614. Queue 606 may be associated with a group, when in existence, comprising playback devices 612 and 614. Queue 606 might comprise a new queue or exist as a renamed version of queue 602 or 604. In some embodiments, in a group, the playback devices 612 and 614 would be assigned to queue 606 and queue 602 and 604 would not be available at that time. In some embodiments, when the group is no longer in existence, queue 606 is no longer available. Each playback device and each combination of playback devices in a network of playback devices, such as those shown in FIG. 1 or that of example playback devices 612, 614, and example combination 616, may be uniquely assigned to a corresponding playback queue.

A playback queue, such as playback queues 602-606, may include identification of media content to be played by the corresponding playback device or combination of playback devices. As such, media items added to the playback queue are to be played by the corresponding playback device or combination of playback devices. The playback device may be configured to play items in the queue according to a specific order (such as an order in which the items were added), in a random order, or in some other order.

The playback queue may include a combination of playlists and other media items added to the queue. In one embodiment, the items in playback queue 602 to be played by the playback device 612 may include items from the audio sources 662, 664, or any of the media items 622-632. The playback queue 602 may also include items stored locally on the playback device 612, or items accessible from the playback device 614. For instance, the playback queue 602 may include Internet radio 626 and album 632 items from audio source 662, and items stored on the playback device 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the playback device 612. In another case, a link to the playlist, for example, rather than a link to the media items in the playlist may be provided to the queue, and the playback device or combination of playback devices may play the media items in the playlist by accessing the media items via the playlist. For example, the album 632 may include pointers to items stored on audio source 662. Rather than adding links to the items on audio source 662, a link to the album 632 may be added to the playback queue 602, such that the playback device 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the playback device 612 and/or on the cloud network. The saved playlist may then be added to playback queue 604 to be played by playback device 614.

VI. Example Ad-Hoc Network

Figure 7:
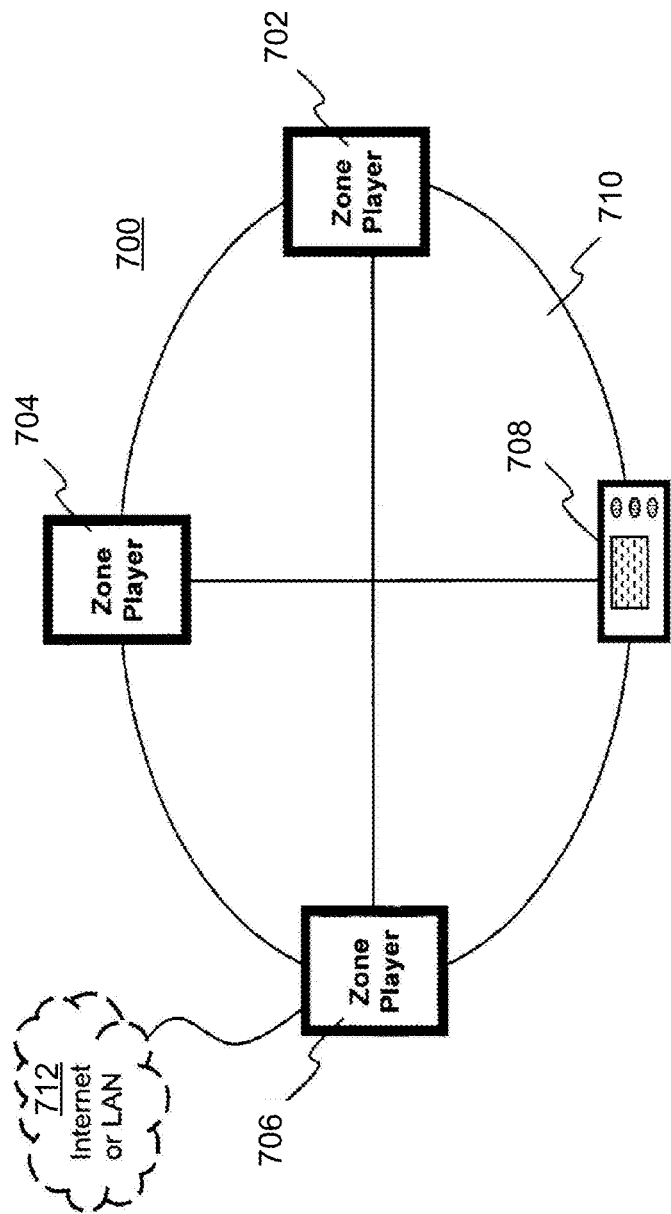
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three playback devices 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a playback device (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The playback device is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The playback device 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each playback device 706, 704, 702 may access the Internet when retrieving media from the cloud (e.g., the Internet) via the bridging device. For example, playback device 702 may contain a uniform resource locator (URL) that specifies an address to a particular audio track in the cloud. Using the URL, the playback device 702 may retrieve the audio track from the cloud, and ultimately play the audio out of one or more playback devices.

VII. Another Example System Configuration

Figure 8:
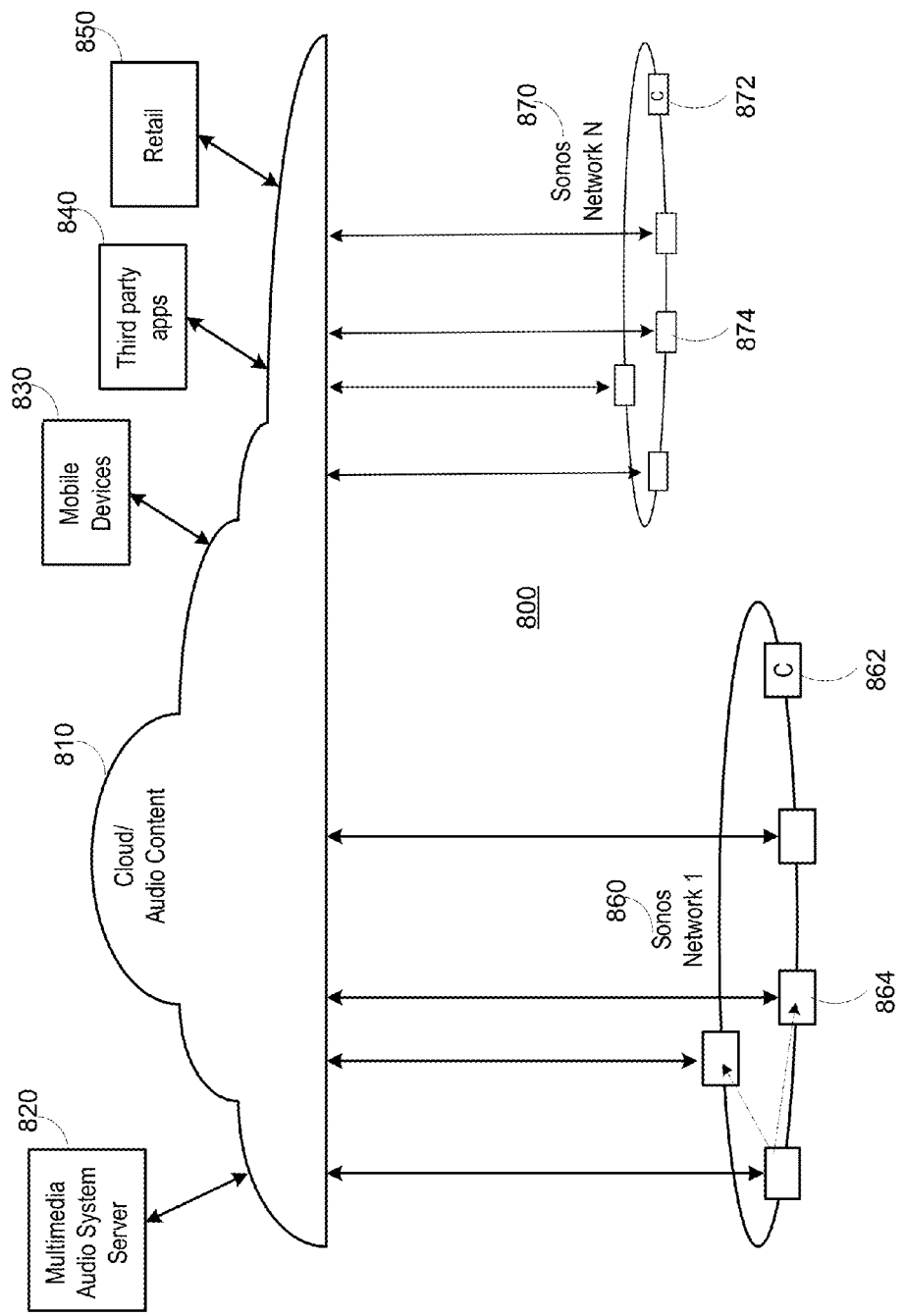
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Display of Software Application Identifier

Certain embodiments described herein relate to a software application that is configured to operate as an add-on software component to audio-playback software on a playback device of a media playback system.

Audio-playback software refers to software installed on a playback device by the manufacturer in order for the playback device to reproduce audio and perform other functions. Versions of audio-playback software can be updated from time to time. By way of illustration, playback devices offered for sale by Sonos, Inc., are purchased with audio-playback software and such software is be upgradable to newer versions of the audio-playback software as new versions are released.

In an embodiment, a controller of a media playback system may display, on the user interface of the controller, an application identifier in association with a zone identifier. The zone identifier may identify a zone of the media playback system, where the zone includes one or more playback devices that have audio-playback software installed thereon. The application identifier may indicate that a software application installed on one or more of the playback devices is actively configured to operate as an add-on software component to the audio-playback software.

Figure 9:
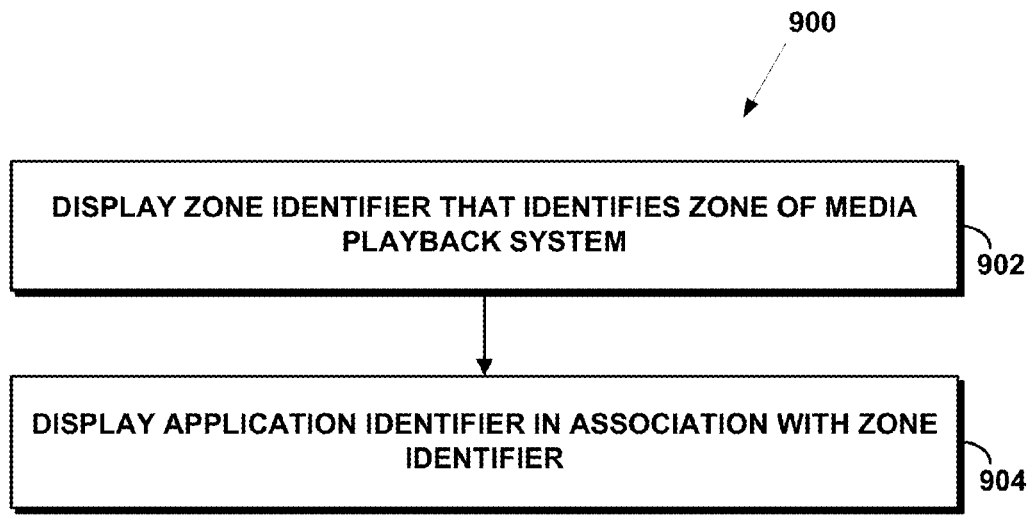
FIG. 9 shows an example flow diagram for displaying an application identifier on a controller of a media playback system.

FIG. 9 shows an example flow diagram 900 displaying an application identifier in association with a zone identifier, in accordance with at least some embodiments described herein. Method 900 shown in FIG. 9 presents an embodiment of a method that could be used in the environments 100, 600, and 700 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-904. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

a. Displaying a Zone Identifier That Identifies a Zone of A Media Playback System At block 902, method 900 involves displaying, on a user interface of a controller of a media playback system, a zone identifier that identifies a zone of the media playback system, where the zone includes a playback device that has audio-playback software installed thereon. The controller may be any suitable controller including, for example, the controller described above in connection with FIGS. 3 and 5.

The user interface may be any suitable user interface communicatively coupled to the controllers and may be remote from and/or local to the controller. In an embodiment, the user interface may be a graphical display that is physically integrated with the controller. For instance, the graphical display may take the form of a screen that is a part of the controller, such as screen 502 described above in connection with controller 500 shown in FIG. 5. In another embodiment, the user interface may be a graphical display that is physically separated from the controller.

The zone, or similarly, zone group, may be any suitable arrangement of one or more playback devices including, for example, the playback devices described above in connection with FIG. 6 and FIG. 7. The playback device(s) may be any suitable playback device including, for example, any playback device described in FIGS. 2, 4, 6, and 7. The audio-playback software installed on the playback device may be any suitable software that assists in audio-playback on a playback device including, for example, module 414 described above with respect to FIG. 4. The audio-playback software may assist in functions of the playback device including, for example, playback of audio and interfacing between playback devices and/or audio sources in a media playback system, among other examples.

Figure 10A:
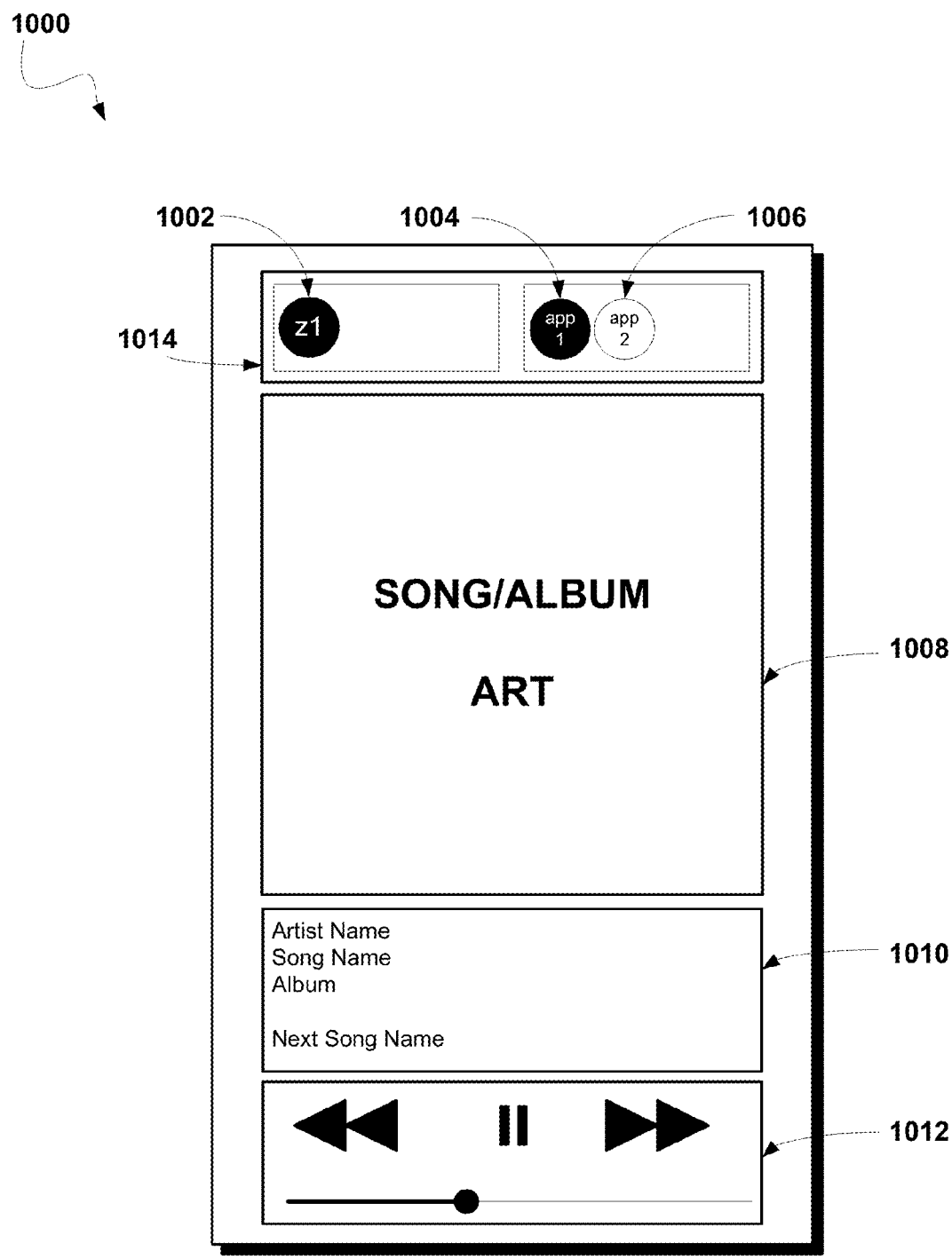
FIG. 10A shows an example graphical display provided by a controller.

FIG. 10A shows an example user interface in the form of a graphical display 1000 provided by a controller in accordance with method 900. As shown, graphical display 1000 includes zone identifier 1002. Zone identifier 1002 may identify a zone in any suitable fashion. In an embodiment, zone identifier 1002 may identify a particular playback device and/or group of playback devices. Other examples are possible as well.

In FIG. 10A, zone identifier 1002 is shown as a circle enclosing the descriptor "z1". In an embodiment, the descriptor "z1" may indicate a first zone. The first zone may be referred to as zone one. While FIG. 10 shows a numeric descriptor, visual indication of zone identifier 1002 may take any suitable form. For example, zone identifier 1002 may be indicated by a word descriptor, such as "Living Room" or "Bedroom." Or, in other embodiments, zone identifier 1002 may be indicated by one or more graphical elements or animations. Many other examples of identifying symbols, numbers, letters, words, or phrases are possible as well.

In further embodiments, additional zone identifiers may also be displayed on graphical display 1000, each of which may indicate a respective zone. In some embodiments, such additional zones may be indicated by numbers, such as "2", "3", or "4". In other embodiments, zones may be identified by descriptors, such as "Living Room," "Bedroom," or "Office." In yet other embodiments, zones may be indicated by one or more graphical elements or animations. Many other examples are possible as well.

Figure 13:
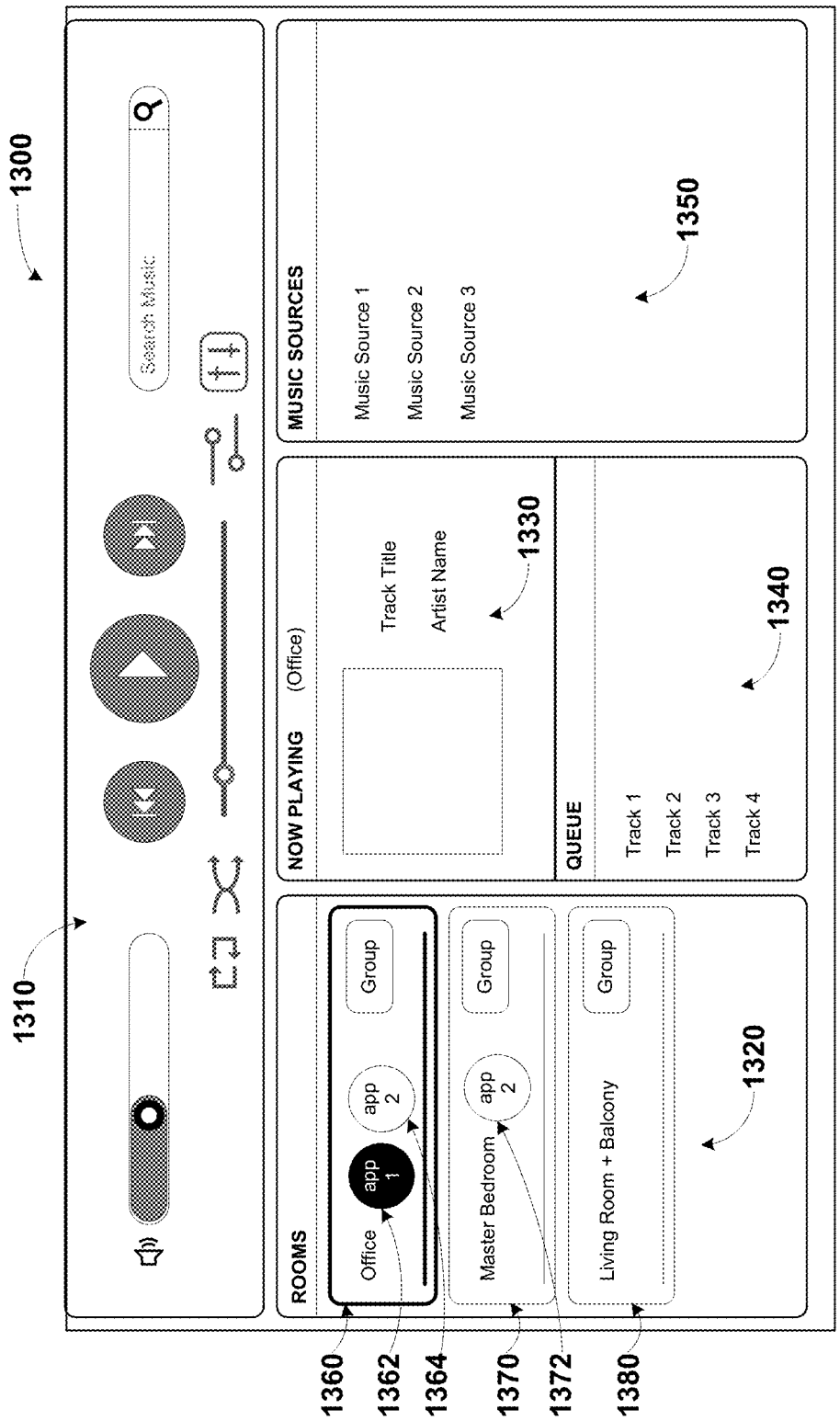
FIG. 13 shows another example graphical display provided by a controller.

FIG. 13 shows another example user interface. The user interface 1300 includes a playback control region 1310, a playback zone region 1320, a playback status region 1330, a playback queue region 1340, and an audio content sources region 1350. Playback zone region includes zone identifiers 1360, 1370, and 1380 that each indicate a zone of a media playback system. The zones are distinguished using word identifiers. For example, zone identifier 1360 is identified as "Office."

In an embodiment, zone identifier 1002 may be selectable such that a user of the controller may select zone identifier 1002 to start audio playing in zone one, to make zone one active, or to make zone one presently under control by the controller, among other examples.

Graphical display 1000 is shown as also including elements other than zone identifier 1002. However, it should be understood that no such other elements need to be displayed. These other elements, discussed further below, are shown for purposes of example and explanation only. In a given embodiment, and at a given point in time, such elements as well as other elements not shown, may be displayed by the graphical display coincident with the display of zone identifier 1002.

Graphical display 1000 is also shown as including track/album art 1008. Track/album art 1008 may provide any suitable and/or desirable graphical representation of an audio track that is currently being played, such as album art associated with the track. Graphical display 1000 is also shown as including audio identification 1010. Audio identification 1010 may include indications including, for example, an indication of the artist name, the track name, the album name, and the name of a next song to be played. However, neither track/album art 1008 nor audio identification 1010 need necessarily be displayed.

Graphical display 1000 is further shown as including playback controls 1012. Playback controls 1012 may include (but need not necessarily include), for example, a forward button, a back button, a pause button, and/or a play button.

In an embodiment where the graphical display corresponds to a touch interface, zone identifier 1002 and playback controls 1012 may be selectable, for example, by the proximity of a human hand, the touch of a human finger, or a stylus to the touch interface, and so on. In an embodiment where the graphical display does not correspond to a touch interface, zone identifier 1002 and playback controls 1012 may be selected by use of a pointer device coupled to the controller, such as a mouse. Other examples may exist as well.

b. Displaying an Application Identifier in Association with the Zone Identifier

Referring back to FIG. 9, at block 904, method 900 involves displaying, on the user interface of the controller, an application identifier in association with the zone identifier, where the application identifier indicates that a software application installed on the playback device is configured to operate as an add-on software component to the audio-playback software. In some embodiments, when the software application is presently operating as an add-on software component, the software application may be referred to as active. Conversely, when the software application is not presently operating as an add-on software component, the software application may be referred to as inactive, or disabled.

FIG. 10A further shows an example application identifier 1004. Application identifier 1004 may identify a software application in any suitable fashion. In FIG. 10, application identifier 1004 is shown as a circle enclosing the descriptor "app1". Application identifier 1006 is shown as a circle enclosing the descriptor "app2." In an embodiment, the descriptors "app1" and "app2" may indicate particular software applications. However, the visual indication of application identifiers may take any suitable form. For example, application identifiers, such as application identifier 1004 and application identifier 1006, may be identified by a word descriptor. In some embodiments, the descriptor may be a trademarked term or symbol that indicates a particular trademarked software application. Many other examples of identifying symbols, numbers, letters, words, or phrases are certainly possible. In some embodiments, graphical icons, drawings, and animations may be used as identifiers as well.

In further embodiments, additional application identifiers may also be displayed on graphical display 1000 where each additional application identifier indicates a respective software application. Such additional playback devices may be indicated by descriptors in the form of letters, such as "a", or "b". In other embodiments, software applications may be identified by word descriptors. As noted above, many other examples of identifying symbols, numbers, letters, words, or phrases are certainly possible. In some embodiments, graphical icons, drawings, and animations may be used as identifiers as well.

In some embodiments, when the software application is inactive, the application identifier may change its appearance, such as by dimming or graying out the application identifier. In other embodiments, the application identifier is not displayed on the user interface when the software application is inactive. In further embodiments, when the software application is active, the change in appearance of the application identifier may be reversed, such as by not dimming the application identifier. When more than one application identifier is displayed on the graphical display, in some embodiments, the application identifier indicating an active software application may appear on the graphical display, and the other application identifiers indicating inactive software applications may be dimmed.

FIG. 10A further shows an association indicator 1014 that depicts the potential association between a zone identifier such as zone identifier 1002 and an application identifier, such as application identifier 1004 and/or 1006. While association indicator 1014 shows association by enclosing zone identifier 1002 and application identifiers 1004 and 1006 within an outline, association may be optionally shown in any other suitable manner.

In an embodiment, the software application may be configured to operate as an add-on software component to the audio-playback software. In some embodiments, the software application may be configured to add to functionality of the audio-playback software. For example, the software application may add additional features to the audio-playback software. For example, the software application may add additional audio processing features to the audio-playback software.

In other embodiments, the software application may be configured to alter functionality of the audio-playback software. For example, the software application may be configured to operate as one or more equalizer pre-sets that adjust frequency components of audio played by the media playback device. In some embodiments, the one or more equalizer pre-sets may relate to specific genres of music. For example, a particular equalizer pre-set for rock music may increase the amplitude of mid-range frequencies while another particular equalizer for pop music may increase the low-range and high-range frequencies. In other embodiments, the one or more equalizer pre-sets may relate to one or more artists. For example, a particular equalizer pre-set may be set according to the preference of the artist. In other embodiments, the one or more equalizer pre-sets may relate to one or more music labels.

By way of illustration, a developer may write a software application that extends or enhances functionality of the media playback system. In some cases, the developer may be a third party in relation to manufacturers of the media playback system and users of the media playback system. However, it is understood that the manufacturer (instead of, or in addition to, a third party developer) may also develop software applications that can be layered on the audio-playback software. Regardless of the developer, each user of a particular media playback system can choose which software applications to install and assign to their respective media playback system. Software applications may be offered for an additional cost. In some circumstances, software applications may be offered free of charge or free via an advertisement support. To facilitate development by third party developers of software applications configured to operate as add-on software components, manufacturers of playback device may provide an application programming interface (API) that specifies how software applications should operate with the audio-playback software.

As noted above, in some embodiments, the one or more equalizer pre-sets may relate to equalizer preferences that may be configured by a user. For example, the equalizer preferences may be individual preferences of a user of the media playback system. Or, the equalizer preferences may be a particular artist's preferences, a particular music producer's preferences, or a particular composer's preferences, among other examples.

In some embodiments, before displaying the application identifier in association with the zone identifier, the controller may determine that the application identifier is in association with the zone identifier. The determination may be based on a song, such as a currently playing song. For example, the determination may be based on metadata of the currently playing song.

In some embodiments, the controller may operate according to one or more user profiles. A particular one of the one or more user profiles may indicate the currently active user. In such embodiments, before displaying the application identifier in association with the zone identifier, the controller may determine whether the user profile is authorized to activate the software application indicated by the application identifier. The determination may be based on whether the user profile is associated with a license. For example, licenses to the software application may be purchased on a per-user basis where each license of the software application is linked to a respective user. The user of the controller may be identified based on user authentication data such as a user name and password combination, a passcode, or a user profile, among other types of user authentication data.

In some embodiments, the controller may determine whether operation of the software application is authorized before displaying the application identifier in association with the zone identifier. In one embodiment, the determination may be based on whether the software application is active in any other zones of the media playback system. For example, the software application may have a per-unit charge, such that a single license of the software application may allow the software application to operate as an add-on software component to the audio-playback software in one zone at a time.

In some embodiments, the controller may cause the software application to be installed on the playback device. For example, the controller may send the software application to the playback device. Or, the controller may cause the playback device to download the software application from a remote server or another device on the local network. The software application may be installed in memory, such as memory 410 in FIG. 4. The software application may be installed on the playback device in any suitable fashion. One of skill in the art will recognize that there are many techniques of causing software to be installed.

In another embodiment, the controller receives the software application from a network device such as, for example, a remote server. The remote server may be connected to the controller via a network, such as the networks described in FIG. 5, 6, or 7, for example. In such embodiments, the controller may receive the software application from the remote server via a network interface, such as network interface 402 as described in FIG. 4, for example.

In some embodiments, the controller may assign the software application to the zone. Assigning the software application to the zone may involve enabling or activating the software on one or more playback devices in the zone such that the software application operates as an add-on software component to audio-playback software on one or more of the playback devices. However, in some embodiments, the software application may be assigned to the zone and be inactive.

Alternatively, assigning the software application to the zone may involve sending the software application to the playback device. For example, the controller may send the software application to the playback device. Or, the controller may cause a remote server to send the software application to the playback device. Other examples are possible as well.

As noted above, FIG. 10A shows application identifier 1004 as a black circle enclosing the descriptor "app1." Such an application identifier may indicate that the software application indicated by application identifier 1004 is presently assigned to the zone. In contrast, FIG. 10A shows application identifier 1006 as a white circle enclosing the descriptor "app2." Such an application identifier may indicate that the software application indicated by application identifier 1004 is not presently assigned to the zone. One having skill in the art will recognize that indications of currently assigned software applications may be made in any suitable manner. Indications of currently assigned software applications are not necessary to method 900, but may appear in some embodiments.

In an embodiment, the controller determines that the zone is playing audio, where the "audio played" is associated with the software application. For example, the played audio may be a song that has associated characteristics, such as metadata, which may include one or more of: an artist, a label, a genre, a music producer, and/or an album, among other examples. As noted above, the controller may be configured to retrieve and navigate a playlist of audio items, modify and/or clear the playback queue of one or more playback devices, control other operations of one or more playback devices, and provide overall control of the system configuration. In an embodiment, the controller may refer to the playback queue of the playback device and determine the track to be played, if any, and the characteristics associated with the track. If the characteristics associated with the track correspond to the software application, the controller may cause the software application to be executed on the playback device.

In an embodiment, the controller determines that the software application has been disassociated with the zone. In some embodiments, the software application may become disassociated when the played audio associated with the software application stops playing, such as a track ends, or when a another track is selected by using playback controls, such as playback controls 1012 in FIG. 10. In response to the determination, the controller may remove the application identifier from being displayed on the user interface of the controller. In some embodiments, the application identifier may be removed from the user interface. In other embodiments, the application identifier may appear in other forms that indicate that the software application has become disassociated with the zone.

In an embodiment, the zone may include two or more playback devices. Each of the two or more playback devices may have audio-playback software installed thereon. In such embodiments, the software application may be installed on each of the two or more playback devices and may be configured to operate as an add-on software component to the audio-playback software installed on each respective playback device. In other embodiments, the software application may be installed on a subset of the playback devices in the zone and may be configured to operate as an add-on software component to the audio playback software installed on each respective playback device in the subset of playback devices in the zone.

As noted above, in some embodiments, the media playback system may include multiple zones. In an embodiment, the controller may reassign the software application from the zone to a different zone. Reassigning the software application may cause the software application to operate as the add-on software component to audio-playback software on one or more playback devices of the different zone and no longer operate on the previous zone.

Figure 10B:
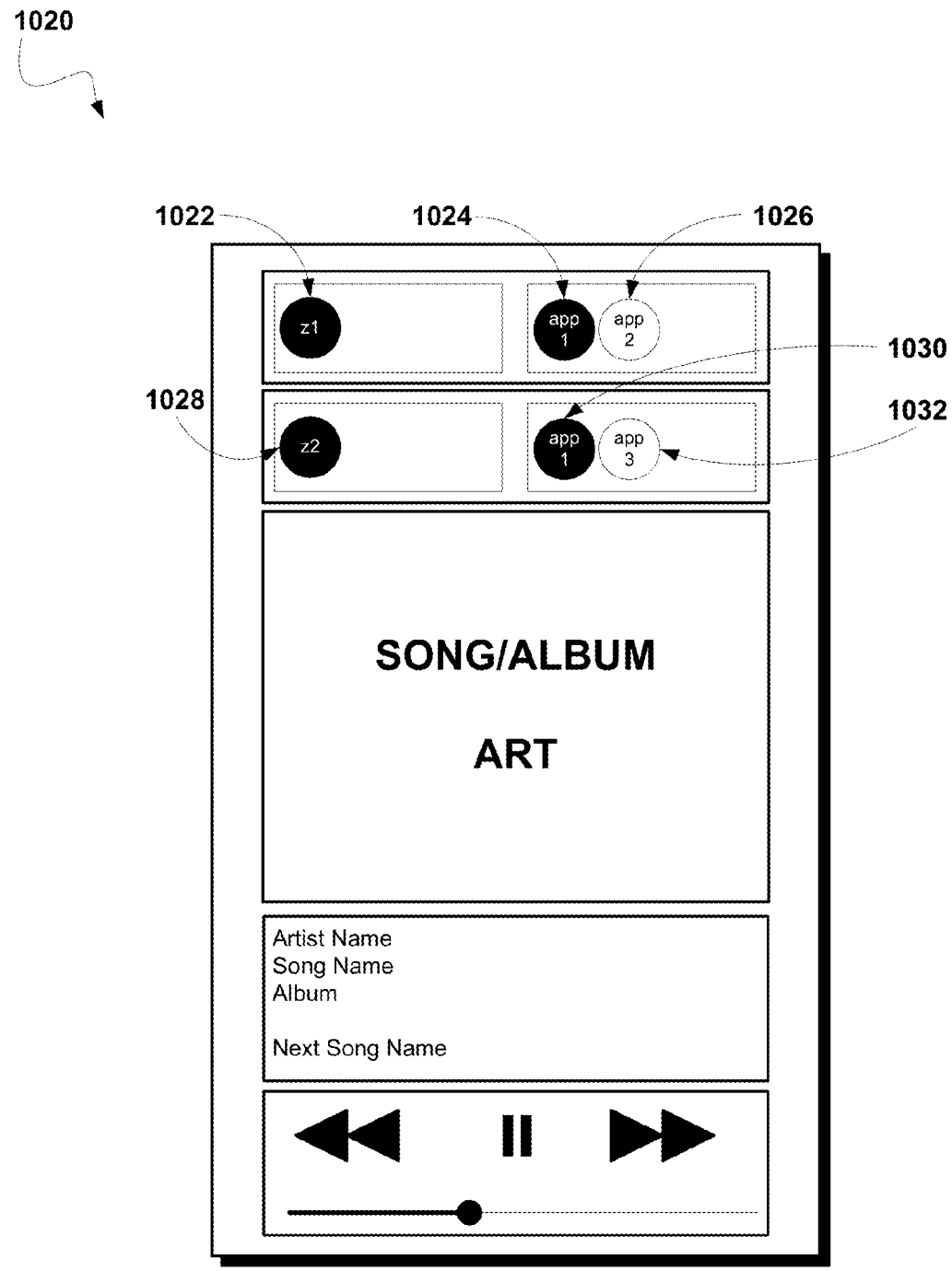
FIG. 10B shows another example graphical display provided by a controller.

FIG. 10B shows another example of application identifiers in association with zone identifiers on a graphical display. In FIG. 10B, application identifiers 1024 and 1026 are shown in association with zone identifier 1022 on graphical display 1020. Application identifiers 1030 and 1032 are shown in association with zone identifier 1028 on graphical display 1020. In some embodiments, a particular software application may be in association with more than one zone identifier. In FIG. 10B, for example, the software application represented by "app1" is indicated by both application identifier 1024 and application identifier 1032.

Figure 11B:
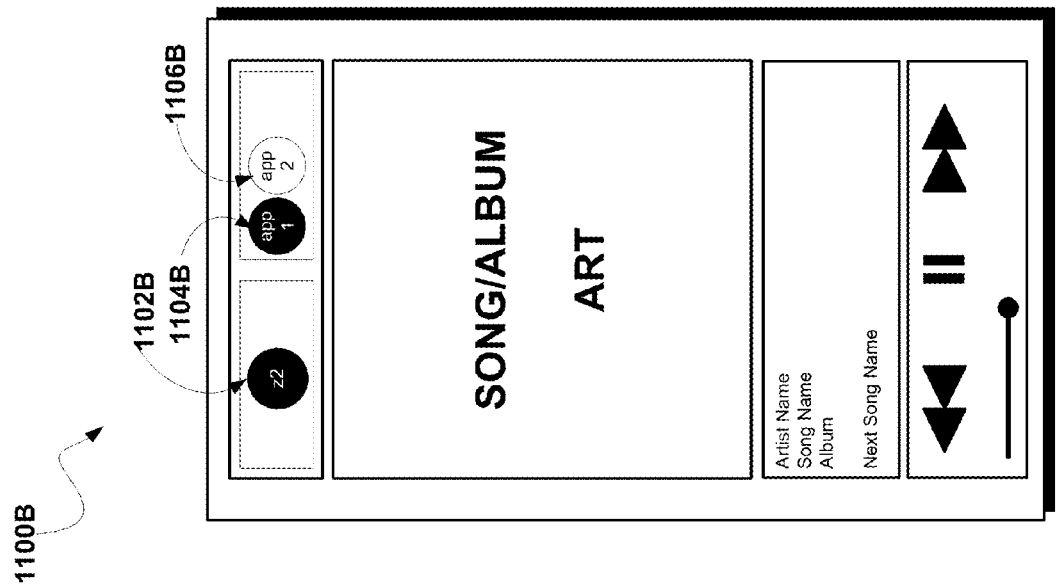
FIGS. 11A and 11B show further example graphical displays provided by a controller.
Figure 11A:
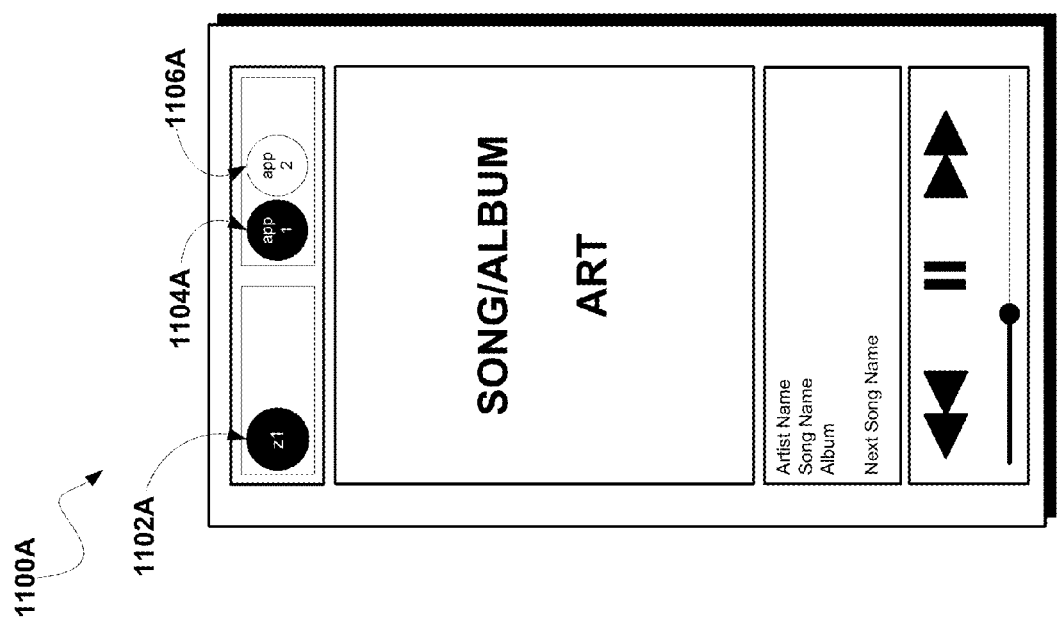

FIG. 11A shows an example user interface before the controller reassigns the software application from a first zone to a different zone. In FIG. 11A, an example user interface in the form of a graphical display 1100A provided by a controller in accordance with method 900 is depicted. As shown, graphical display 1100A includes zone identifier 1102A. FIG. 11A also depicts application identifiers 1104A and 1106A. In FIG. 11A, application identifier 1104A is in association with zone identifier 1102A, while application identifier 1106A is not in association with zone identifier 1102A.

In contrast, FIG. 11B shows an example user interface after the controller reassigns the software application from the first zone to a different zone. In some embodiments, the controller may remove the application identifier in association with the zone identifier from being displayed on the user interface. As shown in FIG. 11B, zone identifier 1102A is removed from graphical display 1100B and zone identifier 1102B is displayed, after the controller reassigns the software application from zone 1102A to zone 1102B. In further embodiments, the controller may display on the user interface of the controller, the application identifier in association with a zone identifier associated with the different zone. For example, FIG. 11B depicts an example user interface in the form of a graphical display 1100B provided by a controller in accordance with method 900, after the software application in association with a zone identifier associated with the different zone. In this example, the zone identifier associated with the different zone is zone identifier 1102B. As noted above, in FIG. 11A, application identifier 1104A (indicating the software application) is in association with zone identifier 1102A (identifying zone "1", as shown). In FIG. 11B, after the controller reassigns the software application from the zone to a different zone, application identifier 1104B (also indicating the software application) is in association with zone identifier 1102B (identifying zone "2", as shown). Other techniques for displaying on the user interface of the controller, the application identifier in association with a zone identifier associated with the different zone are possible as well.

User interfaces 1100A and 1100B shown in FIGS. 11A and 11B respectively may optionally include additional elements. For example, user interfaces 1100A and 1100B may include track/album art, audio identification, and/or playback controls, as shown. These other elements, discussed further above, are shown for purposes of example and explanation only. In a given embodiment, and at a given point in time, such elements as well as other elements not shown, may be displayed by the graphical display.

Returning to FIG. 13, user interface 1300 includes application identifiers 1362, 1364, and 1372. Application identifiers 1362 and 1364 are shown in association with zone identifier 1360 while application identifier 1372 is shown in association with zone identifier 1370. Application identifier 1362 is shown with as white text with a black background to indicate an active software application while application identifier 1364 is shown as black text with a white background to indicate an inactive software application. As noted above, many alternatives for distinguishing between an active and an inactive software applications exist.

IX. Example Assignment of Software Application to a Playback Device

As discussed above, embodiments described herein may relate to a software application that is configured to operate as an add-on software component to audio-playback software on a playback device of a media playback system. In some embodiments, the software application is developed by a third party who wishes to create a software application for use by the media playback system. In some embodiments, the software application may be assigned to one or more playback devices of the same zone and/or different zones. As discussed above, the software application may be configured to add or to alter functionality of the audio-playback software.

Figure 12:
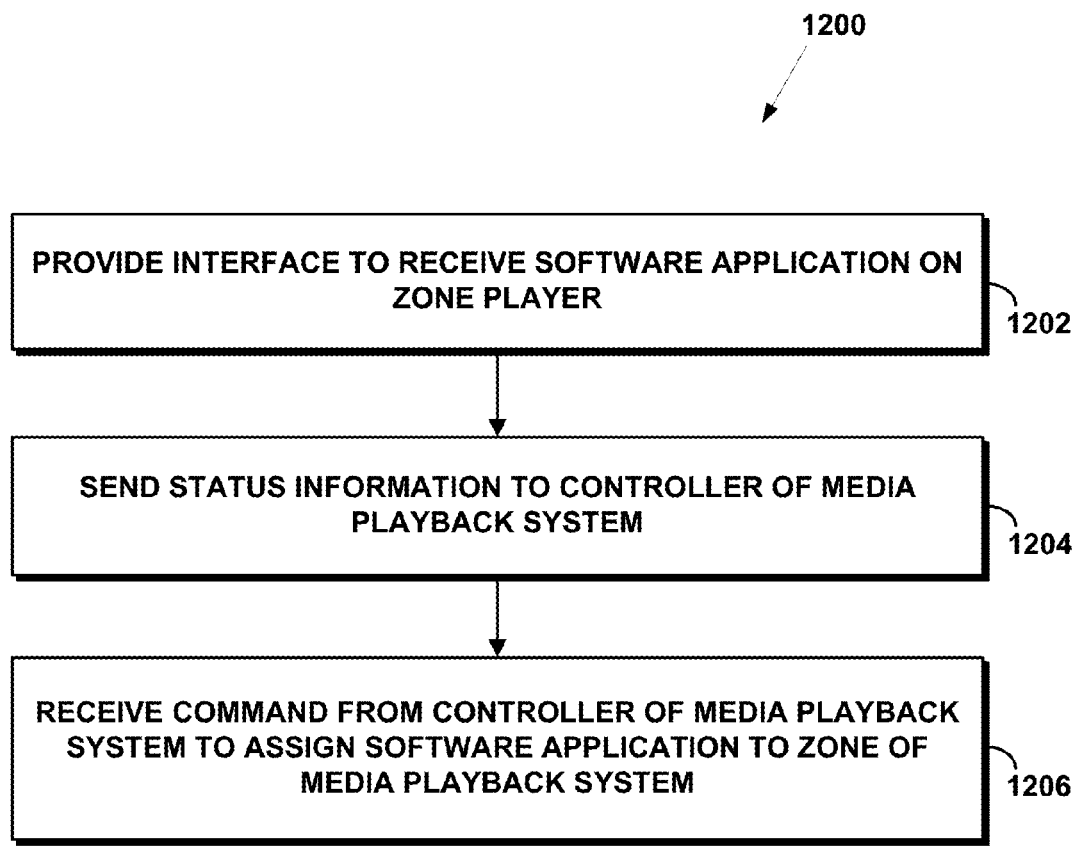
FIG. 12 shows an example flow diagram for assigning a software application to a playback device of a media playback system.

FIG. 12 shows an example method 1200 assigning a software application to a playback device of a media playback system, in accordance with an embodiment. Method 1200 shown in FIG. 12 presents an embodiment of a method that could be used in the environments 100, 600, and 700 with the systems 200, 202, 204, 300, 400, and 500 for example, in communication with one or more devices, such as those illustrated in FIGS. 2-5. Method 1200 may include one or more operations, functions, or actions as illustrated by one or more of blocks 1202-1206. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 12 may represent circuitry that is wired to perform the specific logical functions in the process.

a. Providing an Interface to Receive a Software Application on a Playback Device At block 1202, the playback device provides an interface to receive a software application on a playback device, where the playback device (a) is configured to play audio in a zone of a media playback system, and (b) has audio-playback software installed thereon. For example, the playback device may be any playback device as described in FIG. 2 or 4. In some embodiments, the playback devices described in FIGS. 2 and 4 may be configured to play audio in a zone of a media playback system and may have audio-playback software installed thereon.

The interface may include any suitable mechanism for receiving a software application. For example, the interface may include a network interface, such as network interface 402. As noted above, network interface 402 may include one or both of wireless interface 404 and wired interface 406. In some embodiments, the interface may include one or more modules, such as module 414, which may assist in receiving the software application.

In some embodiments, after providing the interface to receive the software application on a playback device, the playback device receives, via the interface, the software application from a remote server. For example, the playback device may receive the software application over network interface 402, including one or both of wireless interface 404 or wireless interface 406. The remote server may be any suitable server for sending a software application.

In further embodiments, the playback device may install the software application on the playback device. The software application may be installed on the playback device in any suitable fashion. For example, the playback device may store the software application on a computer-readable medium, such as in memory 410 in FIG. 4. One of skill in the art will recognize that there are many techniques of causing software to be installed In some embodiments, the playback device receives a command to remove the software application from the playback device. The command may be sent from a controller of the media playback system, such as controller 500 in FIG. 5. The command may be received via a network interface, such as network interface 402. In some embodiments, removing the software application from the playback device may involve uninstalling the software application from the playback device. For example, the playback device may delete the software application from the computer-readable medium.

In some embodiments, the software application may be configured to alter functionality of the audio-playback software on the playback device. In some embodiments, the software application is further configured to change the audio-playback volume of the playback device at one or more frequency ranges. In some embodiments, changing the audio-playback volume of the playback device at one or more frequency ranges may be referred to as operating as one or more equalizer pre-sets, but changing the audio-playback volume of the playback device at one or more frequency ranges may involve additional or alternative functions to operating as one or more equalizer pre-sets.

For example, the software application may be configured to operate as one or more equalizer pre-sets that adjust frequency components of audio played by the media playback device. In some embodiments, the one or more equalizer pre-sets may relate to specific genres of music. For example, a particular equalizer pre-set for rock music may increase the amplitude of mid-range frequencies while another particular equalizer for pop music may increase the low-range and high-range frequencies. In other embodiments, the one or more equalizer pre-sets may relate to one or more artists. For example, a particular equalizer pre-set may be set according to the preference of the artist. In other embodiments, the one or more equalizer pre-sets may relate to one or more music labels.

As noted above, in some embodiments, the one or more equalizer pre-sets may relate to equalizer preferences that may be configured by a user. For example, the equalizer preferences may be individual preferences of a user of the media playback system. Or, the equalizer preferences may be a particular artist's preferences, a particular music producer's preferences, or a particular composer's preferences, among other examples.

b. Sending Status Information to a Controller of the Media Playback System

At block 1204, the playback device sends status information to the controller of the media playback system, where the status information indicates that the software application is installed on the playback device. The status information may be sent via a network interface, such as network interface 402. In some embodiments, the status information may be sent via a network message. Other examples are possible as well.

The playback device may determine whether the software application is installed on the playback device. For example, the playback device may determine whether the software application is installed on the playback device by referring to a memory, such as memory 410 in FIG. 4. In some embodiments, the software application may be installed in the memory.

In some embodiments, the playback device sends status information to the controller of the media playback system, where the status information indicates that the software application is assigned to the zone of the media playback system. The status information may be sent via a network interface, such as network interface 402. The playback device may determine whether the software application is assigned to the zone of the media playback system. For example, the playback device may determine whether the software application is assigned to the zone of the media playback system by referring to a memory, such as memory 410 in FIG. 4.

In some embodiments, assigning the software application to the zone may involve enabling or activating the software on the playback device in the zone such that the software application operates as an add-on software component to audio-playback software on the playback device.

c. Receiving a Command from the Controller of the Media Playback System

At block 1206, the playback device receives a command from a controller of the media playback system to assign the software application to the zone of the media playback system, where the software application is configured to operate as an add-on software component to the audio-playback software. The command may be received via a network interface, such as network interface 402.

In an embodiment, the playback device installs the software application on the playback device in response to receiving the command to assign the software application to the zone before installing the software application. For example, if the software application is not installed on the playback device when the command to assign the software application to the zone is received, the playback device may install the software application in response to the command.

The command may include data representing user input that instructs the playback device to assign the software application to the zone of the media playback system. The user input may relate to an input interface on a controller, such as input interface 514 in FIG. 5. In some embodiments, the input interface may correspond to a touch interface on a graphical display. In other embodiments, the input interface may correspond to use of a pointer device coupled to the controller, such as a mouse. Other examples may exist as well.

For example, referring to FIG. 10, the command may relate to selection of application identifier 1004 to assign a particular software application indicated by application identifier 1004. Or, the command may relate to selection of application identifier 1006 to assign a particular software application indicated by application identifier 1006.

In some embodiments, the controller may assign the software application to the zone. In some embodiments, assigning the software application to the zone may involve enabling or activating the software on the playback device in the zone such that the software application operates as an add-on software component to audio-playback software on the playback device. As described above, the software application may have one or more functions related to the audio-playback software when the software application operates as the add-on software component to audio-playback software on the playback device.

In some embodiments, the playback device may cause an application identifier in association with a zone identifier to be displayed on a user interface of a controller when the software application indicated by the application identifier is assigned and/or active.

In some embodiments, the playback device may receive a command to play an audio content; and execute the software application on the playback device to alter the audio content when the software application is assigned to the zone of the media playback system. As described above, the software application may have one or more functions related to the audio-playback software when the software application operates as the add-on software component to audio-playback software on the playback device.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application relates to a software application that is configured to operate as an add-on software component to audio-playback software on a media playback device. In one aspect, a method is provided. The method involves displaying, on a user interface of a controller of a media playback system, a zone identifier that identifies a zone of the media playback system, where the zone includes a playback device that has audio-playback software installed thereon. The method also involves displaying, on the user interface of the controller, an application identifier in association with the zone identifier, where the application identifier indicates that a software application installed on the playback device is configured to operate as an add-on software component to the audio-playback software.

In another aspect, a device is provided. The device includes a user interface; a network interface; a processor; a data storage; and a program logic stored in the data storage and executable by the processor to: display, on the user interface of the controller of a media playback system, a zone identifier that identifies a zone of the media playback system, where the zone includes a playback device that has audio-playback software installed thereon; and display, on the user interface of the controller, an application identifier in association with the zone identifier, where the application identifier indicates that a software application installed on the playback device is configured to operate as an add-on software component to the audio-playback software.

In another aspect, a non-transitory computer readable memory is provided. The non-transitory computer readable memory has stored thereon instructions executable by a controller to cause the controller to perform functions. The functions include displaying, on a user interface of a controller of a media playback system, a zone identifier that identifies a zone of the media playback system, where the zone includes a playback device that has audio-playback software installed thereon. The functions further include displaying, on the user interface of the controller, an application identifier in association with the zone identifier, where the application identifier indicates that a software application installed on the playback device is configured to operate as an add-on software component to the audio-playback software.

In another aspect, a second method is provided. The method involves displaying providing an interface to receive a software application on a playback device, where the playback device (a) is configured to play audio in a zone of a media playback system, and (b) has audio-playback software installed thereon; sending status information to a controller of the media playback system, where the status information indicates that the software application is installed on the playback device; and receiving a command from the controller of the media playback system to assign the software application to the zone of the media playback system, where the software application is configured to operate as an add-on software component to the audio-playback software.

In another aspect, a media playback device is provided. The media playback device includes a network interface; a processor; a data storage; and a program logic stored in the data storage and executable by the processor to: receive a software application via a network interface, where the media playback device (a) is configured to play audio in a zone of a media playback system, and (b) has audio-playback software installed thereon; send status information to a controller of the media playback system, where the status information indicates that the software application is installed on the playback device; and receive a command from the controller of the media playback system to assign the software application to the zone of the media playback system, where the software application is configured to operate as an add-on software component to the audio-playback software.

In another aspect, a second non-transitory computer readable medium is provided. The non-transitory computer readable memory has stored thereon instructions executable by a controller to cause the controller to perform functions. The functions include receiving a command from a controller of a media playback system to assign a software application to a zone of the media playback system, where the playback device (a) is configured to play audio in the zone of the media playback system, and (b) has audio-playback software installed thereon; providing an interface to receive the software application on the playback device, where the software application is configured to operate as an add-on software component to the audio-playback software; and sending status information to a controller of the media playback system, where the status information indicates that the software application is installed on the playback device.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

I claim:

1. A playback device, comprising:
    a network interface;
    a processor;
    memory storing instructions that when executed by the processor cause the playback device to perform functions comprising:
        transmitting, to a computing device, data indicating that a first add-on component installed on the playback device is activated, wherein the first add-on component causes a first modification of playback when activated;
        receiving, from the computing device, a command to activate a second add-on component installed on the playback device;
        in response to receiving the command, activating the second add-on component on the playback device, wherein the second add-on component causes a second modification of playback when activated; and
        causing playback of audio using at least the second add-on component.

2. The playback device of claim 1, wherein the functions further comprise:
    receiving, from the computing device, a playback command to initiate playback of a media item while the first add-on component is active; and
    causing playback of the media item using at least the first add-on component.

3. The playback device of claim 1, wherein the functions further comprise:

in response to receiving the command, deactivating the first add-on component.

4. The playback device of claim 3, wherein the functions further comprise:
transmitting, to the computing device, data indicating that the first add-on component is inactive on the playback device.

5. The playback device of claim 1, wherein the second add-on component is associated with a media item, wherein causing playback of audio using at least the second add-on component comprises causing playback of the media item using at least the second add-on component, and wherein the functions further comprise in response to completing playback of the media item, disabling the second add-on component.

6. The playback device of claim 5, wherein the functions further comprise:
in response to receiving the command, deactivating the first add-on component; and
in response to completing playback of the media item, activating the first add-on component.

7. The playback device of claim 1, wherein the functions further comprise:
receiving, from the computing device, the second add-on component for installation on the playback device.

8. The playback device of claim 1, wherein the functions further comprise:
receiving, from a second computing device remote from the playback device, the second add-on component for installation on the playback device.

9. The playback device of claim 1, wherein the functions further comprise:
transmitting, to the computing device, data indicating that the second add-on component is active on the playback device.

10. A tangible non-transitory computer-readable medium having stored thereon instructions executable by one or more processors to cause an apparatus to perform functions comprising:
transmitting, to a computing device, data indicating that a first add-on component installed on the apparatus is activated, wherein the first add-on component causes a first modification of playback when activated;
receiving, from the computing device, a command to activate a second add-on component installed on the apparatus;
in response to receiving the command, activating the second add-on component on the apparatus, wherein the second add-on component causes a second modification of playback when activated; and
causing playback of audio using at least the second add-on component.

11. The tangible non-transitory computer-readable medium of claim 10, wherein the functions further comprise:
receiving, from the computing device, a playback command to initiate playback of a media item while the first add-on component is active; and
causing playback of the media item using the first add-on component.

12. The tangible non-transitory computer-readable medium of claim 10, wherein the functions further comprise:
in response to receiving the command, deactivating the first add-on component.

13. The tangible non-transitory computer-readable medium of claim 10, wherein the functions further comprise:
receiving, from a second computing device remote from the apparatus, the second add-on component for installation on the apparatus.

14. The tangible non-transitory computer-readable medium of claim 10, wherein the functions further comprise:
transmitting, to the computing device, data indicating that the second add-on component is active on the apparatus.

15. The tangible non-transitory computer-readable medium of claim 10, wherein the second add-on component is associated with a media item,
wherein causing playback of audio using at least the second add-on component comprises causing playback of the media item using at least the second add-on component, and
wherein the functions further comprise:
in response to completing playback of the media item, disabling the second add-on component;
in response to receiving the command, deactivating the first add-on component; and
in response to completing playback of the media item, activating the first add-on component.

16. A method, comprising:
transmitting, to a computing device, data indicating that a first add-on component installed on a playback device is activated, wherein the first add-on component causes a first modification of playback when activated;
receiving, from the computing device, a command to activate a second add-on component installed on a playback device;
in response to receiving the command, activating the second add-on component on the playback device, wherein the second add-on component causes a second modification of playback when activated; and
causing playback of audio using at least the second add-on component.

17. The method of claim 16, further comprising:
receiving, from the computing device, a playback command to initiate playback of a media item while the first add-on component is active;
causing playback of the media item using the first add-on component; and
in response to receiving the command, deactivating the first add-on component.

18. The method of claim 16, wherein the second add-on component is associated with a media item,
wherein causing playback of audio using at least the second add-on component comprises causing playback of the media item using at least the second add-on component, and
wherein the method further comprises:
in response to completing playback of the media item, disabling the second add-on component;
in response to receiving the command, deactivating the first add-on component; and
in response to completing playback of the media item, activating the first add-on component.

19. The method of claim 16, further comprising:
receiving, from a second computing device remote from the playback device, the second add-on component for installation on the playback device.

20. The method of claim 16, further comprising:
transmit, to the computing device, data indicating that the second add-on component is active on the playback device.

* * * * *